(12) United States Patent
Lanahan

(10) Patent No.: US 10,443,237 B2
(45) Date of Patent: Oct. 15, 2019

(54) TRUNCATED ICOSAHEDRA ASSEMBLIES

(71) Applicant: Samuel J. Lanahan, Vancouver, WA (US)

(72) Inventor: Samuel J. Lanahan, Vancouver, WA (US)

( * ) Notice: Subject to any disclaimer, the term of this patent is extended or adjusted under 35 U.S.C. 154(b) by 0 days.

(21) Appl. No.: 15/957,677

(22) Filed: Apr. 19, 2018

(65) Prior Publication Data

US 2018/0305926 A1   Oct. 25, 2018

Related U.S. Application Data

(60) Provisional application No. 62/487,934, filed on Apr. 20, 2017.

(51) Int. Cl.
*E04C 1/00* (2006.01)
*F16S 3/00* (2006.01)

(52) U.S. Cl.
CPC . *E04C 1/00* (2013.01); *F16S 3/00* (2013.01)

(58) Field of Classification Search
CPC .................................... E04C 1/00; F16S 3/00
See application file for complete search history.

(56) References Cited

U.S. PATENT DOCUMENTS

| 824,501 A | 6/1906 | Molloy |
| 2,682,235 A | 6/1954 | Fuller |
| 3,063,521 A | 11/1962 | Fuller |
| 3,169,611 A | 2/1965 | Snelson |
| 3,197,927 A * | 8/1965 | Fuller .................. E04B 1/3211 52/20 |

(Continued)

FOREIGN PATENT DOCUMENTS

| DE | 3306051 A1 | 8/1984 |
| FR | 2570614 A1 | 3/1986 |

(Continued)

OTHER PUBLICATIONS

International Search Report and Written Opinion issued in related International Application No. PCT/US2018/028294, dated Jul. 31, 2018 (11 pages).

(Continued)

*Primary Examiner* — Joshua K Ihezie
(74) *Attorney, Agent, or Firm* — Klarquist Sparkman, LLP

(57) ABSTRACT

A truncated icosahedron assembly can include a plurality of structural elements coupled together in a truncated icosahedral configuration. Each structural element can include first and second hexagonal portions and first and second pentagonal portions. The hexagonal portions of each structural element can be coupled together at a first edge of the first hexagonal portion and a second edge of the second hexagonal portion. The pentagonal portions of each structural element can be spaced relative to each other by the first and second hexagonal portions. The first pentagonal portion of each structural element can be coupled to the hexagonal portions adjacent the first edge of the first hexagonal portion and the second edge of the second hexagonal portion. The second pentagonal portion of each structural element can be coupled to the hexagonal portions adjacent the first edge of the first hexagonal portion and the second edge of the second hexagonal portion.

20 Claims, 23 Drawing Sheets

(56) References Cited

U.S. PATENT DOCUMENTS

| | | | |
|---|---|---|---|
| 3,203,144 A * | 8/1965 | Fuller | E04B 1/3211 52/537 |
| 3,236,004 A | 2/1966 | Christiansen | |
| 3,354,591 A | 11/1967 | Fuller | |
| 3,510,962 A | 5/1970 | Sato | |
| 3,566,531 A | 3/1971 | Hasel et al. | |
| 3,586,645 A | 6/1971 | Granger et al. | |
| 3,611,620 A | 10/1971 | Perry | |
| 3,722,153 A * | 3/1973 | Baer | E04B 1/32 403/176 |
| 3,822,499 A | 7/1974 | De Vos | |
| 3,866,366 A | 2/1975 | Fuller | |
| 3,925,941 A * | 12/1975 | Pearce | A63B 9/00 52/80.2 |
| 3,953,948 A * | 5/1976 | Hogan | E04B 1/34815 52/81.4 |
| 3,970,301 A | 7/1976 | Lehmann | |
| 4,079,541 A * | 3/1978 | Hogan | A63H 33/108 446/122 |
| 4,207,715 A | 6/1980 | Kitrick | |
| 4,238,905 A * | 12/1980 | MacGraw, II | A63H 33/046 273/157 R |
| 4,582,495 A | 4/1986 | Orgass et al. | |
| 4,701,131 A * | 10/1987 | Hildebrandt | A63F 9/12 434/211 |
| 4,719,726 A | 1/1988 | Bergman | |
| 4,723,382 A | 2/1988 | Lalvani | |
| 4,744,780 A | 5/1988 | Volpe | |
| 4,823,532 A | 4/1989 | Westerburgen | |
| 4,964,834 A | 10/1990 | Myller | |
| 5,007,220 A * | 4/1991 | Lalvani | B44C 3/123 52/653.1 |
| RE33,785 E * | 12/1991 | Hildebrandt | A63F 9/12 434/211 |
| 5,524,396 A * | 6/1996 | Lalvani | E04B 1/19 52/311.2 |
| 5,732,518 A | 3/1998 | Roberts | |
| 5,827,105 A | 10/1998 | Felgenhauer et al. | |
| 5,906,530 A * | 5/1999 | Lindsey | A63H 27/10 446/221 |
| 5,921,048 A * | 7/1999 | Francom | E04C 3/08 242/437.3 |
| 6,050,044 A | 4/2000 | McIntosh | |
| 6,050,873 A | 4/2000 | Reisman | |
| 6,282,849 B1 | 9/2001 | Tuczek | |
| 6,379,212 B1 * | 4/2002 | Miller | A63H 33/084 446/85 |
| 6,531,107 B1 | 3/2003 | Spencer et al. | |
| 6,645,033 B1 | 11/2003 | Thomsen | |
| 6,648,715 B2 | 11/2003 | Wiens et al. | |
| 6,652,347 B1 * | 11/2003 | Stevkovski | A63F 9/0838 434/211 |
| 6,672,789 B2 | 1/2004 | Chen | |
| 6,739,937 B2 | 5/2004 | Snelson | |
| 6,841,456 B2 * | 1/2005 | Hersee | G21H 1/02 438/478 |
| 6,965,026 B2 | 11/2005 | Zaworotko et al. | |
| 7,063,587 B1 | 6/2006 | Lin | |
| 7,169,957 B2 * | 1/2007 | Atwood | C07C 39/14 568/719 |
| 7,216,038 B2 | 5/2007 | Vitaliano et al. | |
| 7,219,017 B2 | 5/2007 | Vitaliano et al. | |
| 7,219,018 B2 | 5/2007 | Vitaliano et al. | |
| 7,238,429 B2 | 7/2007 | Cook et al. | |
| 7,253,014 B2 | 8/2007 | Barron et al. | |
| 7,318,303 B1 * | 1/2008 | Kling | E04B 1/19 52/648.1 |
| 7,351,284 B2 | 4/2008 | Yoshii | |
| 7,396,520 B2 | 7/2008 | Howard et al. | |
| 7,407,711 B2 | 8/2008 | Phelps et al. | |
| 7,422,793 B2 | 9/2008 | Phelps et al. | |
| 7,452,578 B2 | 11/2008 | Lanahan | |
| 7,491,376 B2 | 2/2009 | Barron et al. | |
| 7,641,869 B2 | 1/2010 | Tenne et al. | |
| 7,671,230 B2 | 3/2010 | Bolskar et al. | |
| 7,694,463 B2 * | 4/2010 | Lanahan | E04B 1/19 446/118 |
| 7,825,161 B2 | 11/2010 | Kronholm et al. | |
| 7,951,351 B2 | 5/2011 | Ma et al. | |
| 7,954,296 B2 | 6/2011 | Newland | |
| 7,976,814 B2 | 7/2011 | Miyazawa et al. | |
| 7,981,774 B2 | 7/2011 | Grier et al. | |
| 8,007,338 B2 | 8/2011 | Stevkovski | |
| 8,062,702 B2 | 11/2011 | Barron et al. | |
| 8,220,563 B2 | 7/2012 | Bangaru et al. | |
| 8,241,648 B2 | 8/2012 | Zhou et al. | |
| 8,361,349 B2 | 1/2013 | Barron et al. | |
| 8,388,401 B2 | 3/2013 | Lanahan | |
| 8,395,037 B2 | 3/2013 | Yudoh | |
| 8,450,404 B2 | 5/2013 | Bowen, III et al. | |
| 8,507,778 B2 | 8/2013 | Olson | |
| 8,508,838 B2 | 8/2013 | Steinhardt et al. | |
| 8,590,627 B2 | 11/2013 | Jin et al. | |
| 8,664,629 B2 | 3/2014 | Bowen, III et al. | |
| 8,715,738 B2 | 5/2014 | Chung et al. | |
| 8,741,250 B2 | 6/2014 | Hawthorne et al. | |
| 9,034,297 B2 | 5/2015 | Mercuri | |
| 9,057,705 B2 | 6/2015 | Yang et al. | |
| 9,076,738 B2 | 7/2015 | Watanabe et al. | |
| 9,133,324 B2 | 9/2015 | Bowen, III et al. | |
| 9,231,214 B2 | 1/2016 | Tolbert et al. | |
| 9,290,665 B2 | 3/2016 | Barron et al. | |
| D787,519 S * | 5/2017 | Nolan | D14/440 |
| 2001/0016283 A1 * | 8/2001 | Shiraishi | B01J 20/20 429/218.2 |
| 2003/0082986 A1 | 5/2003 | Wiens et al. | |
| 2004/0155518 A1 | 8/2004 | Schlanger | |
| 2004/0158999 A1 | 8/2004 | Trantow | |
| 2006/0160446 A1 * | 7/2006 | Lanahan | E04B 1/19 442/59 |
| 2006/0234600 A1 * | 10/2006 | Pacheco | A63H 33/046 446/124 |
| 2007/0003807 A1 | 1/2007 | Wudl et al. | |
| 2007/0025918 A1 | 2/2007 | Hurd | |
| 2007/0042089 A1 | 2/2007 | Grah | |
| 2007/0119522 A1 | 5/2007 | Grier et al. | |
| 2007/0256370 A1 * | 11/2007 | Whittingham | E04B 1/3211 52/81.1 |
| 2008/0003293 A1 | 1/2008 | Hirsch et al. | |
| 2008/0004345 A1 | 1/2008 | Tabata et al. | |
| 2008/0040984 A1 | 2/2008 | Lanahan | |
| 2008/0070727 A1 * | 3/2008 | Avis | A63B 41/08 473/604 |
| 2008/0131353 A1 | 6/2008 | Gibson et al. | |
| 2008/0171204 A1 | 7/2008 | Barron et al. | |
| 2008/0188415 A1 * | 8/2008 | Koruga | A61K 8/19 424/489 |
| 2008/0193490 A1 | 8/2008 | Hirsch et al. | |
| 2008/0213324 A1 | 9/2008 | Zhou et al. | |
| 2008/0217445 A1 | 9/2008 | Asahi et al. | |
| 2008/0268989 A1 * | 10/2008 | Lalvani | A63B 41/08 473/598 |
| 2009/0029441 A1 | 1/2009 | Wang et al. | |
| 2009/0118392 A1 | 5/2009 | Barron et al. | |
| 2009/0169807 A1 | 7/2009 | Yang et al. | |
| 2009/0212265 A1 | 8/2009 | Steinhardt et al. | |
| 2009/0263615 A1 * | 10/2009 | Lanahan | E04B 1/19 428/80 |
| 2009/0302029 A1 | 12/2009 | Krishna et al. | |
| 2009/0311440 A1 | 12/2009 | Li et al. | |
| 2010/0003536 A1 | 1/2010 | Smith et al. | |
| 2010/0206553 A1 | 8/2010 | Bailey et al. | |
| 2010/0216978 A1 | 8/2010 | Shih | |
| 2010/0249447 A1 | 9/2010 | Lada et al. | |
| 2010/0297009 A1 | 11/2010 | Olson et al. | |
| 2010/0302643 A1 * | 12/2010 | Larreta | G02B 27/08 359/616 |
| 2011/0003773 A1 | 1/2011 | Kepley et al. | |
| 2011/0042069 A1 | 2/2011 | Bailey et al. | |
| 2011/0045031 A1 | 2/2011 | Hirsch et al. | |
| 2011/0046253 A1 | 2/2011 | Bowen, III et al. | |

(56) References Cited

U.S. PATENT DOCUMENTS

| | | |
|---|---|---|
| 2011/0114880 A1 | 5/2011 | Blank et al. |
| 2011/0130580 A1 | 6/2011 | Hirsch et al. |
| 2011/0151542 A1 | 6/2011 | Wang et al. |
| 2011/0162751 A1 | 7/2011 | Fitzgerald et al. |
| 2011/0168451 A1 | 7/2011 | DiGiovanni et al. |
| 2011/0204319 A1 | 8/2011 | Virkar et al. |
| 2011/0220348 A1 | 9/2011 | Jin et al. |
| 2011/0220415 A1 | 9/2011 | Jin et al. |
| 2011/0223339 A1 | 9/2011 | Furukawa et al. |
| 2011/0251072 A1 | 10/2011 | Grier et al. |
| 2012/0043502 A1 | 2/2012 | Eastwood et al. |
| 2012/0049112 A1 | 3/2012 | Steinhardt et al. |
| 2012/0119162 A1 | 5/2012 | Barron et al. |
| 2012/0183468 A1 | 7/2012 | Farrell et al. |
| 2012/0231194 A1 | 9/2012 | Bowen, III et al. |
| 2012/0241670 A1 | 9/2012 | Bae et al. |
| 2012/0331269 A1 | 12/2012 | Aras |
| 2013/0072604 A1 | 3/2013 | Bowen, III et al. |
| 2013/0164884 A1 | 6/2013 | Grier et al. |
| 2013/0194668 A1 | 8/2013 | Liang et al. |
| 2013/0194670 A1 | 8/2013 | Liang et al. |
| 2013/0196139 A1 | 8/2013 | Lewis et al. |
| 2013/0215513 A1 | 8/2013 | Liang et al. |
| 2013/0302922 A1 | 11/2013 | Steinhardt et al. |
| 2014/0051820 A1 | 2/2014 | Steinhardt et al. |
| 2014/0079746 A1 | 3/2014 | Andrievsky |
| 2014/0138612 A1 | 5/2014 | Virkar et al. |
| 2014/0231145 A1 | 8/2014 | Kverel et al. |
| 2014/0231148 A1 | 8/2014 | Kverel et al. |
| 2015/0037766 A1* | 2/2015 | Schein .................... G06F 17/10 434/211 |
| 2015/0160569 A1 | 6/2015 | Osorio Oliveros |
| 2015/0315775 A1* | 11/2015 | Schein .................. E04B 1/3211 52/741.1 |
| 2016/0009620 A1 | 1/2016 | Kokubo et al. |
| 2016/0082108 A1 | 3/2016 | Shih |
| 2016/0163652 A1 | 6/2016 | Barron et al. |
| 2016/0177959 A1 | 6/2016 | Marya et al. |
| 2016/0276052 A1 | 9/2016 | Schaffer et al. |
| 2016/0276674 A1 | 9/2016 | Xia et al. |
| 2016/0312011 A1 | 10/2016 | Kokubo et al. |
| 2016/0318810 A1 | 11/2016 | Goswami et al. |
| 2017/0247874 A1* | 8/2017 | Roberts ................. E04B 1/3211 |

FOREIGN PATENT DOCUMENTS

| | | |
|---|---|---|
| GB | 2231502 A | 11/1990 |
| JP | 04330140 | 11/1992 |
| WO | WO 2006/028903 A2 | 3/2006 |
| WO | WO 2008/020843 A1 | 2/2008 |

OTHER PUBLICATIONS

"DNA Technique Yields 3-D Crystalline Organization of Nanoparticles," *Center for Fucntional Nanomaterials*, http://www.bnl.gov/cfn/news/PRdisplay.asp?prID=07-127, 3 pp. (downloaded Mar. 12, 2008).

"Platonic Solid," http://mathworld.wolfram.com/PlatonicSolid.html, 6 pp. (downloaded May 18, 2006).

"The Icosahedron Fractal," http://www.public.asu.edu/~starlite/icosahedronfractal.html, 3 pp. (downloaded Mar. 10, 2008).

Cornelissen et al., "The p-adic Icosahedron," *Notices of the AMS*, vol. 52, No. 7, pp. 720-727 (Aug. 2005).

Fuller, E.B., "Allspace-Filling Tensegrity Arrays," *Synergetics*, pp. 428-431 (1975).

Georgakilas et al., "Supramolecular self-assembled fullerence nanostructures," *PNAS* vol. 99, No. 8, pp. 5075-5080 (Apr. 16, 2002).

International Search Report and Written Opinion for PCT/US05/31145.

International Search Report and Written Opinion for PCT/US06/31940.

Kennedy et al., "Crystal-Packing Trends for a Series of 6, 9, 12, 15, 18-Pentaaryl-1-hydro [60] fullerenes." *Chemistry—A European Journal*, vol. 18. No. 24, pp. 7418-7433 (2012).

Pearce, Peter, Structure in Nature is a Strategy for Design, Ch.11, "Infinite Spatial Networks from Equilateral Triangles," pp. 144-153 (1978).

Rittenhouse et al., "Filling in the Hexagonal Close-Packed Unit Cell," *Journal of Chemical Education*, http://jchemed.chem.wisc.edu/JCEWWW/Articles/FillingHCP/FillingHCP.ptml, 7 pp. (downloaded May 18, 2006).

\* cited by examiner

TRUNCATED ICOSAHEDRA ASSEMBLIES

CROSS REFERENCE TO RELATED APPLICATION

This application claims the benefit of U.S. Provisional Application No. 62/487,934, filed Apr. 20, 2017, which application is incorporated by reference herein in its entirety.

FIELD

This disclosure relates generally to structural assemblies and more particularly to truncated icosahedra assemblies.

BACKGROUND

In geometry, an icosahedron is a polyhedron that is comprised of twenty faces. In a "regular" icosahedron each of the twenty faces forms an equilateral triangle. The regular icosahedron is one of the five Platonic solids, which have long since been recognized and appreciated by mathematicians for their aesthetic beauty and symmetry. The other four Platonic solids are a regular tetrahedron (pyramid with all faces being equilateral triangles), a regular hexahedron (cube), a regular octahedron (eight-sided figure with all faces being equilateral triangles), and a regular dodecahedron (twelve-sided figure with pentagonal faces).

A "truncated" icosahedron can be constructed from an icosahedron cutting off the 12 vertices of the icosahedron such that each edge is cut off at both ends. This creates 12 new pentagon faces and leaves the original 20 triangle faces as regular hexagons. Thus, the truncated icosahedron has 12 regular pentagonal faces, 20 regular hexagonal faces, 60 vertices and 90 edges.

SUMMARY

Described herein are various embodiments of truncated icosahedra assemblies. Polyhedron-based structures, such as truncated icosahedrons, have been recognized to have superior strength-to-weight ratios and other characteristics that make them suitable for structural applications.

A truncated icosahedron assembly can comprise a plurality of structural elements coupled together in a truncated icosahedral configuration. Each structural element can include first and second hexagonal portions and first and second pentagonal portions. The hexagonal portions of each structural element can be coupled together at a first edge of the first hexagonal portion and a second edge of the second hexagonal portion. The pentagonal portions of each structural element can be spaced relative to each other by the first and second hexagonal portions. The first pentagonal portion of each structural element can be coupled to the hexagonal portions adjacent the first edge of the first hexagonal portion and the second edge of the second hexagonal portion. The second pentagonal portion of each structural element can be coupled to the hexagonal portions adjacent the first edge of the first hexagonal portion and the second edge of the second hexagonal portion.

In one representative embodiment, an assembly can comprise a plurality of structural elements coupled together in a truncated icosahedral configuration. Each structural element can include first and second hexagonal portions and first and second pentagonal portions. The hexagonal portions of each structural element can be coupled together at a first edge of the first hexagonal portion and a second edge of the second hexagonal portion. The pentagonal portions of each structural element can be spaced relative to each other by the first and second hexagonal portions. The first pentagonal portion of each structural element can be coupled to the hexagonal portions adjacent the first edge of the first hexagonal portion and the second edge of the second hexagonal portion. The second pentagonal portion of each structural element can be coupled to the hexagonal portions adjacent the first edge of the first hexagonal portion and the second edge of the second hexagonal portion. The structural elements are configured such that the structural elements can be coupled together in a truncated icosahedral configuration.

In some embodiments, the plurality of structural elements comprises six structural elements.

In some embodiments, each of the structural elements is rotated 90 degrees relative to an adjacent structural element.

In some embodiments, the structural elements comprise curved surfaces such that the structural elements form a sphere when the structural elements are coupled together.

In some embodiments, the structural elements comprise inside surfaces and outside surfaces, wherein at least one of the outside surfaces comprises a first coating, and at least one of the inside surfaces comprises a second coating. In some embodiments, the at least one first coating is configured to react with a substance more slowly than the at least one second coating reacts with the substance.

In some embodiments, the structural elements are coupled together magnetically.

In some embodiments, the structural elements are flexible. In some embodiments, the structural elements are rigid.

In some embodiments, one of the structural elements is formed from a different material than another structural element.

In some embodiments, the structural elements are coupled together by attachment members.

In some embodiments, the attachment members engage the structural elements in a snap-fit connection.

In some embodiments, the structural elements comprise mating features configured to interlock the structural elements relative to adjacent structural elements.

In some embodiments, the assembly is one of a plurality of assemblies that are coupled together with connecting members to form a hexagonal layer.

In some embodiments, the hexagonal layer is one of a plurality of hexagonal layers that are stacked and coupled together.

In some embodiments, each of the hexagonal layers is rotationally offset relative to an adjacent layer so as to form one or more helices.

In some embodiments, each of the hexagonal layers is rotationally offset relative to an adjacent layer by about 60-180 degrees.

In another representative embodiment, an assembly comprises a first structural member, a second structural member, and a connecting member. The first and second structural members each include a plurality of structural elements coupled together in a truncated icosahedral configuration. The connecting member is coupled to and extends between the first and second structural members.

In some embodiments, the assembly further comprises a first coupler and a second coupler, wherein the connecting member is coupled to the first structural member by the first coupler and is coupled to the second structural member by the second coupler. In some embodiments, the first and second couplers are configured to threadably engage the first and second structural members, respectively.

The various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosure will become more apparent from the following detailed description, which proceeds with reference to the accompanying figures.

DETAILED DESCRIPTION

Figure 1:
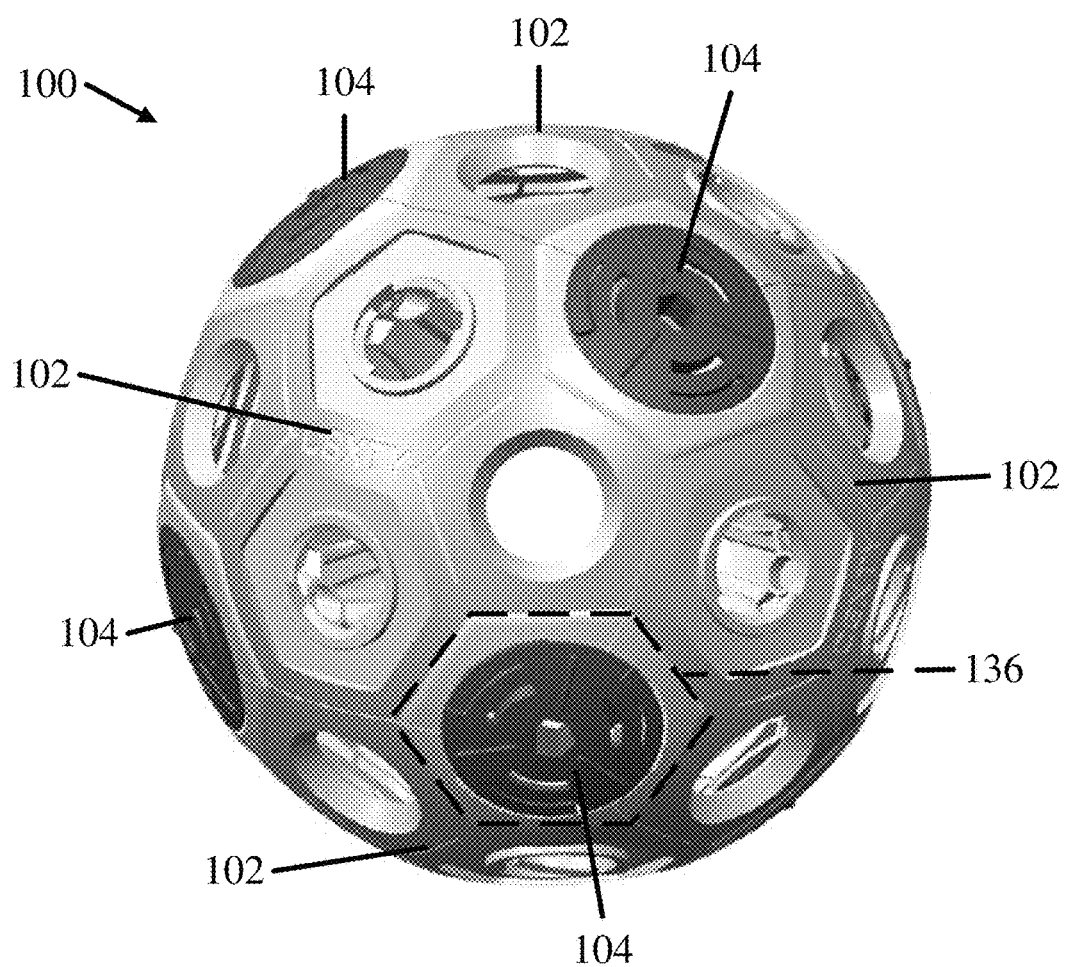
FIG. 1 shows an exemplary embodiment of a truncated icosahedron assembly.

For purposes of this description, certain aspects, advantages, and novel features of the embodiments of this disclosure are described herein. The described methods, systems, and apparatus should not be construed as limiting in any way. Features, characteristics, and/or groups described in conjunction with a particular aspect, embodiment or example are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The disclosure is not restricted to the details of any foregoing embodiments. The disclosure extends to any novel one, or any novel combination, of the features disclosed in this specification (including any accompanying claims, abstract, and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatus can be used in conjunction with other systems, methods, and apparatus.

The explanations of terms and abbreviations herein are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

As used herein, the term "and/or" used between the last two of a list of elements means any one of, or any combination of, the listed elements. For example, the phrase "A, B, and/or C" means "A," "B," "C," "A and B," "A and C," "B and C," or "A, B, and C."

As used herein, the terms "attached" and "coupled" generally mean physically connected or linked, which includes items that are directly attached/coupled and items that are attached/coupled with intermediate elements between the attached/coupled items, unless specifically stated to the contrary.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, claims, abstract, and drawings.

Described herein are various embodiments of truncated icosahedra assemblies. Polyhedron-based structures, such as truncated icosahedrons, have been recognized to have superior strength-to-weight ratios and other characteristics that make them suitable for structural applications.

Figure 2:
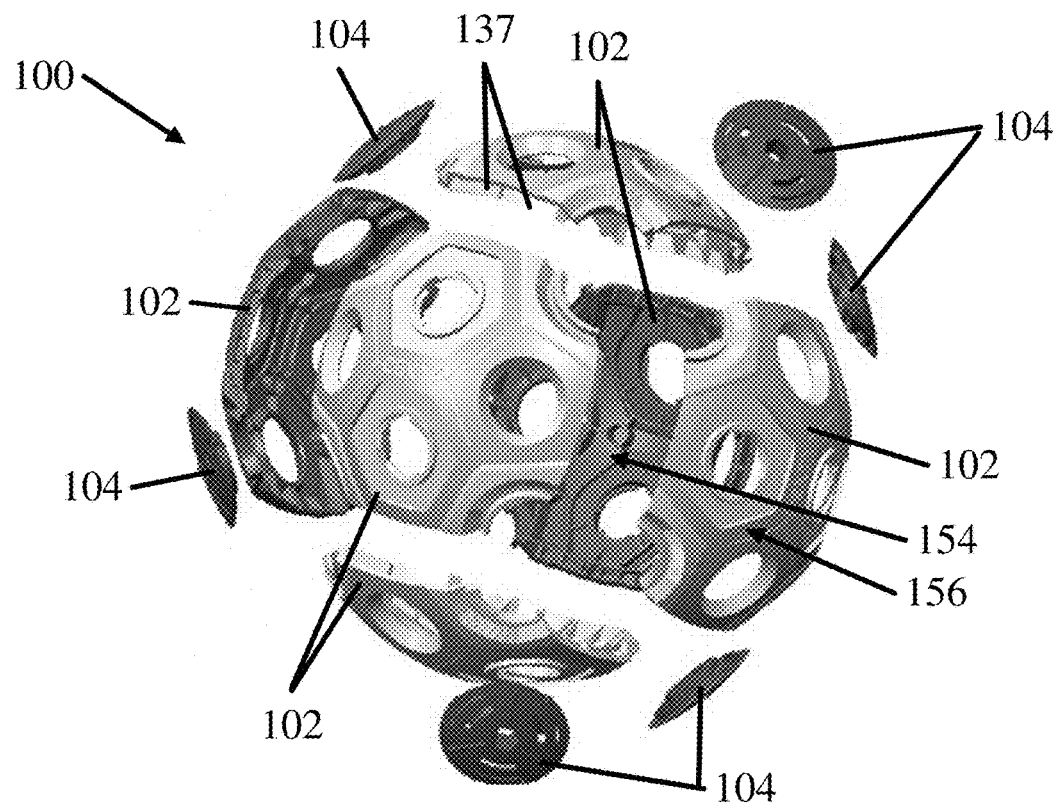
FIG. 2 is an exploded view of the truncated icosahedron assembly of FIG. 1.

FIGS. 1-6 show an exemplary embodiment of a truncated icosahedron assembly 100. Referring to FIG. 2, the assembly 100 can comprise a plurality of structural elements 102 (e.g., six in the illustrated embodiment) and, optionally, a plurality of attachment members 104 (e.g., eight in the illustrated embodiment, but only six shown in FIG. 2). As shown in FIG. 1, the attachment members 104 can be used to couple the structural elements 102 together in a spherical icosahedral configuration.

Figure 3:
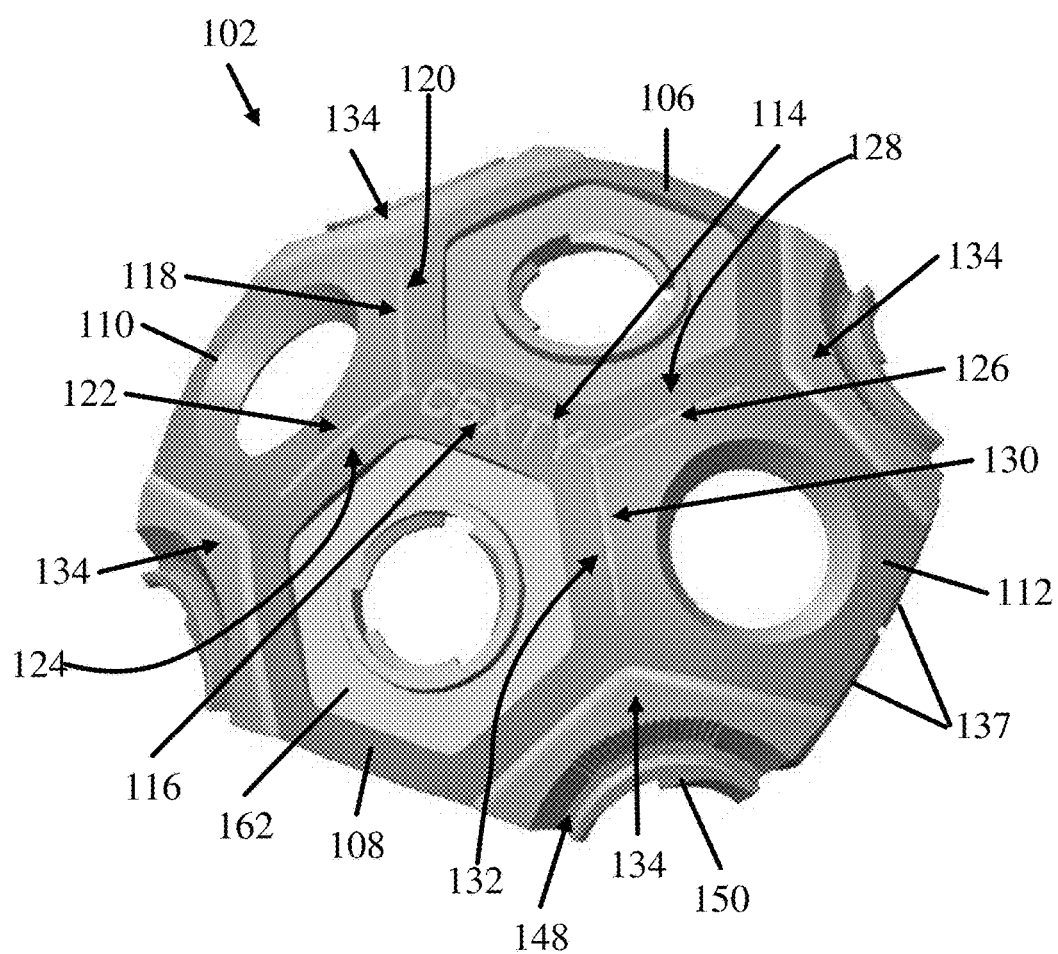
FIG. 3 is a perspective view of a structural element of the truncated icosahedron assembly of FIG. 1.

Referring to FIG. 3, each structural element 102 can include first and second hexagonal portions 106, 108 and first and second pentagonal portions 110, 112. The first and second hexagonal portions 106, 108 of each structural element are coupled together at a first edge 114 of the first hexagonal portion 106 and a first edge 116 of the second hexagonal portion 108.

The first and second pentagonal portions 110, 112 are spaced relative to each other by the first and second hexagonal portions 106, 108. A first edge 118 of the first pentagonal portion 110 can be coupled to a second edge 120 of the first hexagonal portion 110. A second edge 122 of the first pentagonal portion 110 can be coupled to a second edge 124 of the second hexagonal portion 112. A first edge 126 of the second pentagonal portion 112 can be coupled to a third edge 128 of the first hexagonal portion 110. A second edge 130 of the second pentagonal portion 112 can be coupled to a third edge 132 of the second hexagonal portion 112.

Each of the structural elements 102 can also include a plurality of partial hexagonal portions 134. The partial hexagonal portions 134 can comprise two sides or ⅓ of a hexagon. Thus, as shown in FIG. 1, the partial hexagonal portions 134 of three adjacent structural elements 102 collectively form a hexagon 136 (which may be referred to as a virtual hexagon) when the structural elements 102 are coupled together in an icosahedral configuration.

Figure 4:
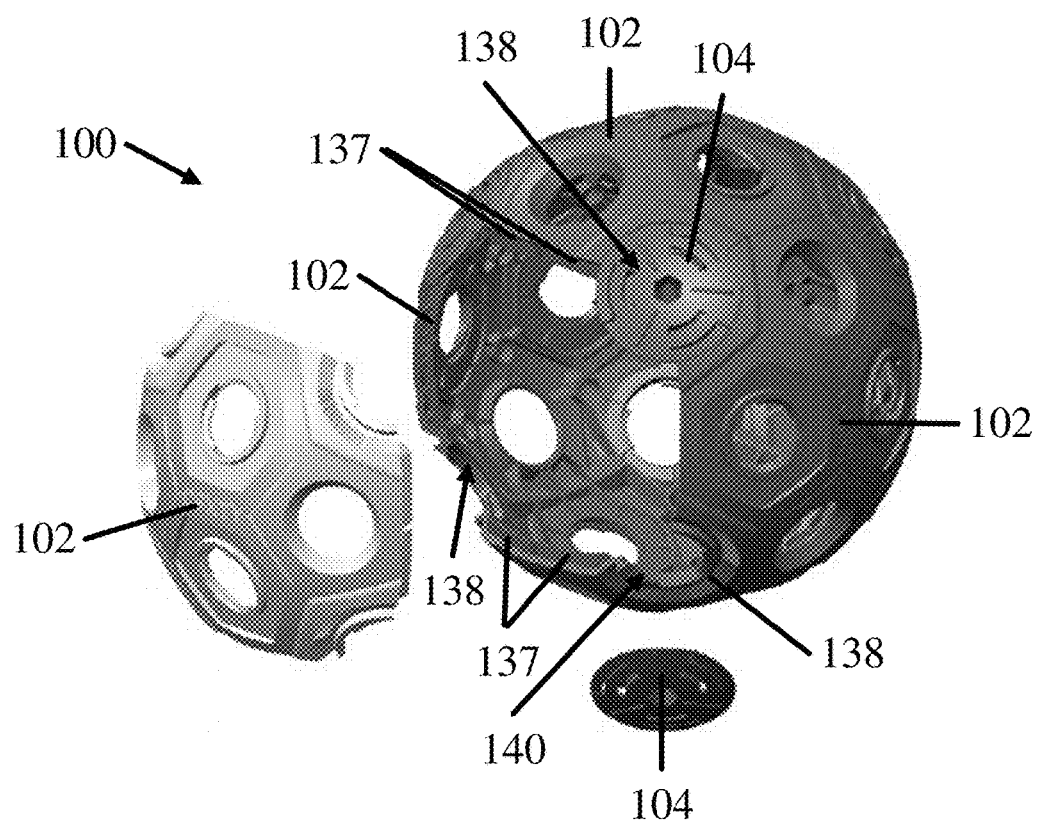
FIG. 4 is a partially exploded view of the truncated icosahedron assembly of FIG. 1.

The structural elements 102 can be arranged in the icosahedral configuration by rotating the structural elements 102 90 degrees relative to adjacent structural elements 102, as best shown in FIG. 4.

The structural elements 102 can be coupled together in various ways. For example, the structural elements 102 can be coupled together chemically, mechanically, electrically, biologically, and/or by any other coupling means. In certain embodiments, the structural elements 102 can comprise mating features such that structural elements 102 can be snap-fit together. In other embodiments, the structural elements 102 can be coupled together with fasteners such as screws, bolts, rivets, staples, straps, and/or any other fastening means. In other embodiments, the structural elements 102 can be coupled together by welding and/or an adhesive. In yet other embodiments, the structural elements 102 can be coupled together magnetically.

In some embodiments, the structural elements 102 can comprise mating features configured to interlock the structural elements 102 relative to adjacent structural elements. For example as best shown in FIGS. 2-4, two sides of the structural elements 102 (e.g., the sides adjacent the pentagonal portions 110,112) can comprise projections 137 configured to extend, and two other sides of the structural elements 102 (e.g., the sides adjacent the hexagonal portions 106, 108) can comprise a grooves or notches (not shown). The notches of the structural elements 102 can be configured to receive the projections 137 of an adjacent structural element 102 when the structural elements 102 are assembled.

In certain embodiments, the attachment members 104 can be used to couple the structural elements 102 together, as best shown in FIG. 1. As best shown in FIGS. 1 and 4, the attachment members 104 can be coupled to the structural elements 102 at junctions 138 of the structural elements 102. The junctions 138 can be formed where three of the structural elements 102 meet.

Figure 5:
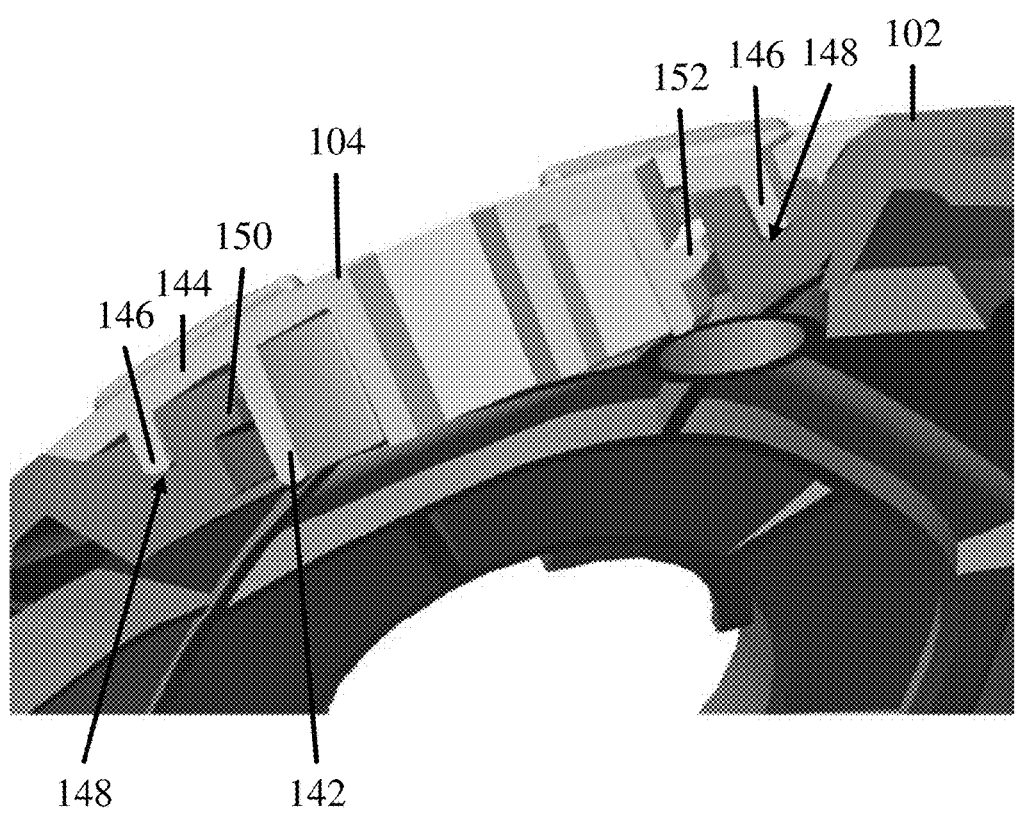
FIG. 5 is a detail cross-sectional view of the truncated icosahedron assembly of FIG. 1.

Referring now to FIG. 4, in some embodiments, the structural elements 102 can collectively form openings 140 at the junctions 138. In such embodiments, the attachment members 104 can, for example, be configured to extend at least partially into the openings 140, as best shown in FIG. 5.

Figure 6:
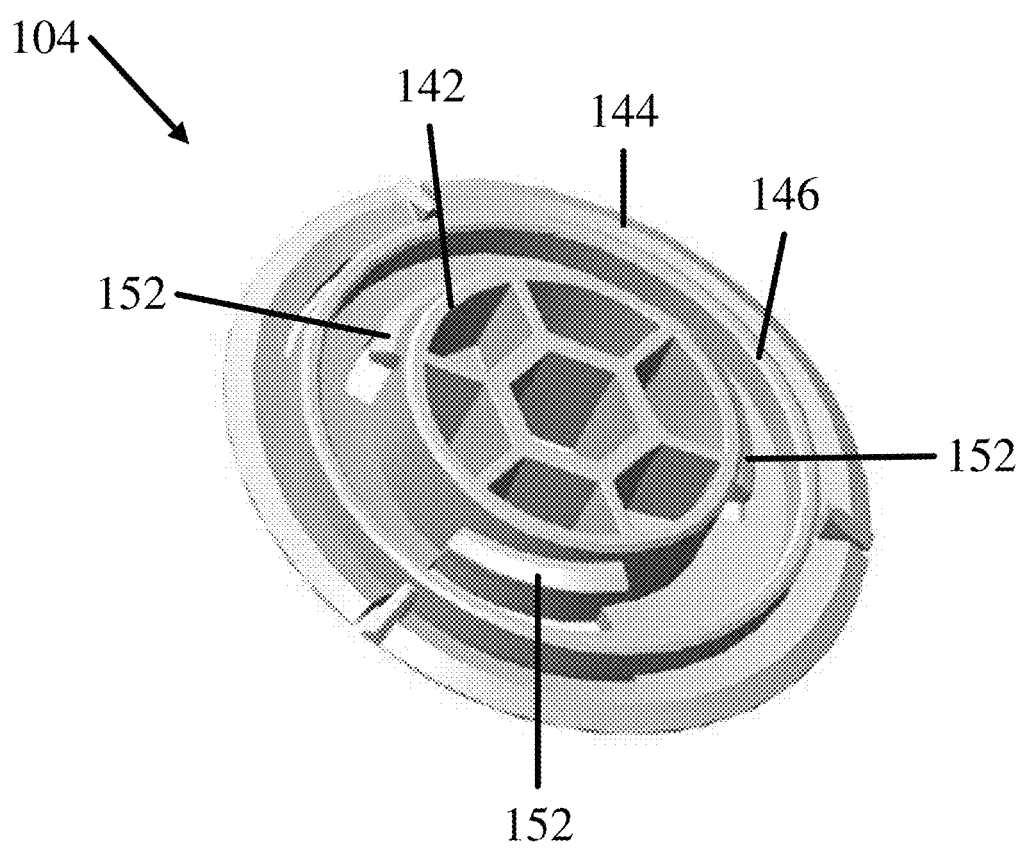
FIG. 6 is a perspective view of an attachment element of the truncated icosahedron assembly of FIG. 1.

Referring to FIG. 6, the attachment members 104 can each comprise an annular main body portion 142 and a flange portion 144 coupled to and extending radially outwardly from the main body portion 142. The main body portion 142 can be configured to extend into the opening 140 of the structural elements 102. The flange portion 144 can be configured to contact surfaces of the structural elements 102 adjacent the opening 140 (FIG. 5).

In some embodiments, the flange portion 144 can include an annular projection or lip 146. Referring again to FIG. 5, the lip 146 can, in some embodiments, be configured to engage a recess or groove 148 formed in the structural elements 102 adjacent and radially spaced from the opening 140.

In some embodiments, the structural elements 102 and the attachment members 104 can comprise mating features to selectively secure the structural elements 102 and the attachment members 104 together. For example, as shown in FIGS. 5-6, the structural elements 104 can comprise internal threads 150 surround the openings 140, and the main body 142 can comprise external threads 152 configured to threadably engage the internal threads 150 of the structural elements 102.

In other embodiments, the structural element 102 and the attachment members 104 can comprise various other mating features. For example, the mating features can be snap-fit type mating features.

Figure 7:
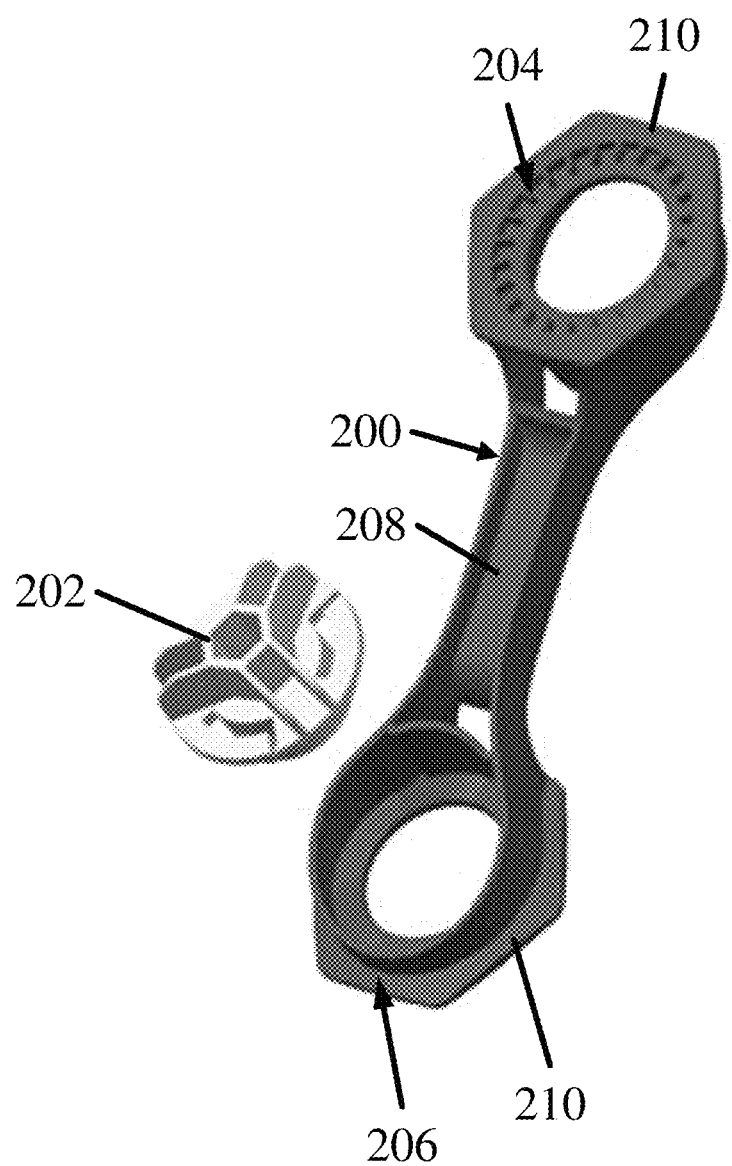
FIG. 7 shows exemplary embodiments a connecting member and a coupler.
Figure 8:
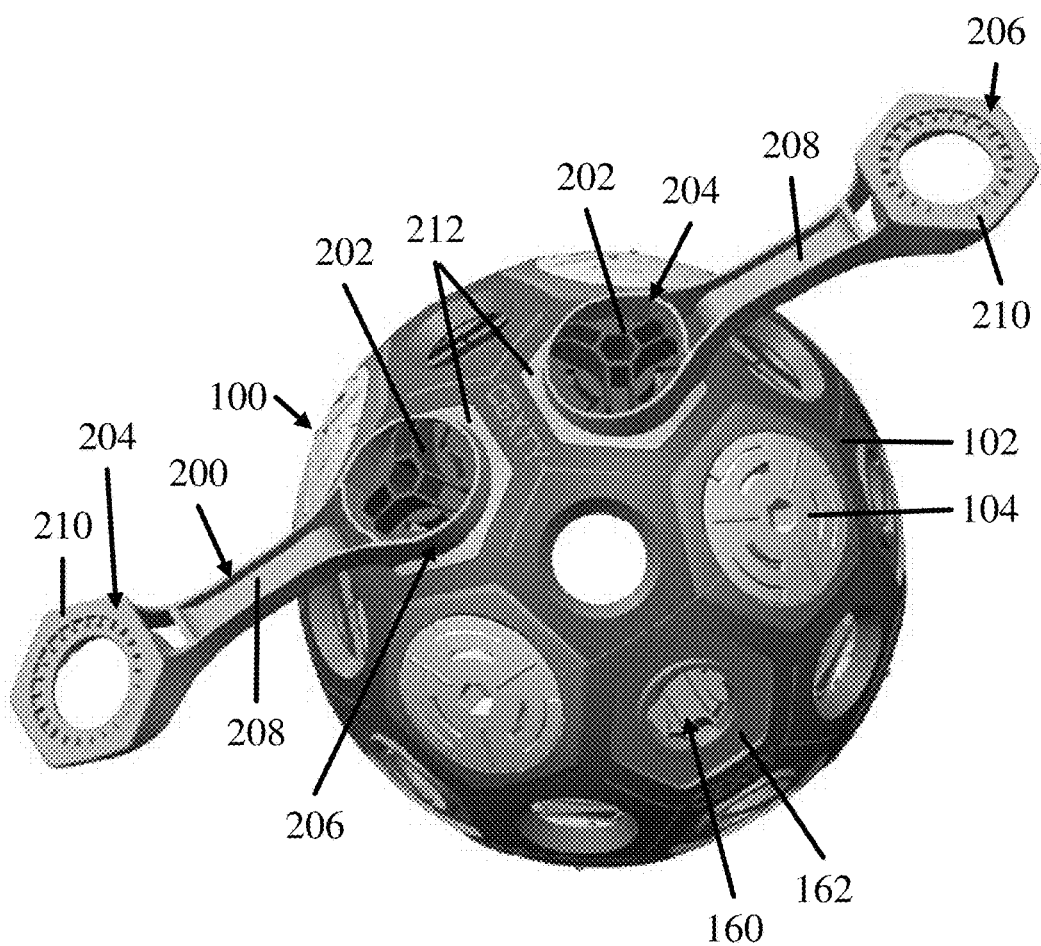
FIG. 8 is a perspective view of the truncated icosahedron assembly of FIG. 1 with the connecting member and coupler of FIG. 7 attached thereto.

FIG. 7 shows an exemplary embodiment of a connecting member 200 and an optional coupler 202. The connecting member 200 and the coupler 202 can be configured to be coupled to and extend from the assembly 100, as shown in FIG. 8. In this manner, the connecting member 200 and the coupler 202 can be used to coupled one assembly 100 (e.g., a first assembly) to another object or structure (e.g., a second assembly).

Referring again to FIG. 7, the connecting member 200 can comprise a first end portion 204, a second end portion 206, and an intermediate portion 208 disposed between the first and second end portions 204, 206. The first and second end portions 204, 206 can be configured to be coupled to the assembly 100.

In some embodiments, the first and second end portions 204, 206 can coupled directly to the assembly 100. For example, the first and second end portions 204, 206 can comprise external threads configured to engage corresponding internal threads 160 of apertures 162 of the assembly 100. In other embodiments, the first and second end portions 204, 206 can be coupled to the assembly 100 via a snap-fit type connection. In other embodiments, the first and second end portions 204, 206 can coupled to the assembly 100 in various other ways (e.g., with adhesive, welding, fasteners, etc.)

Figure 9:
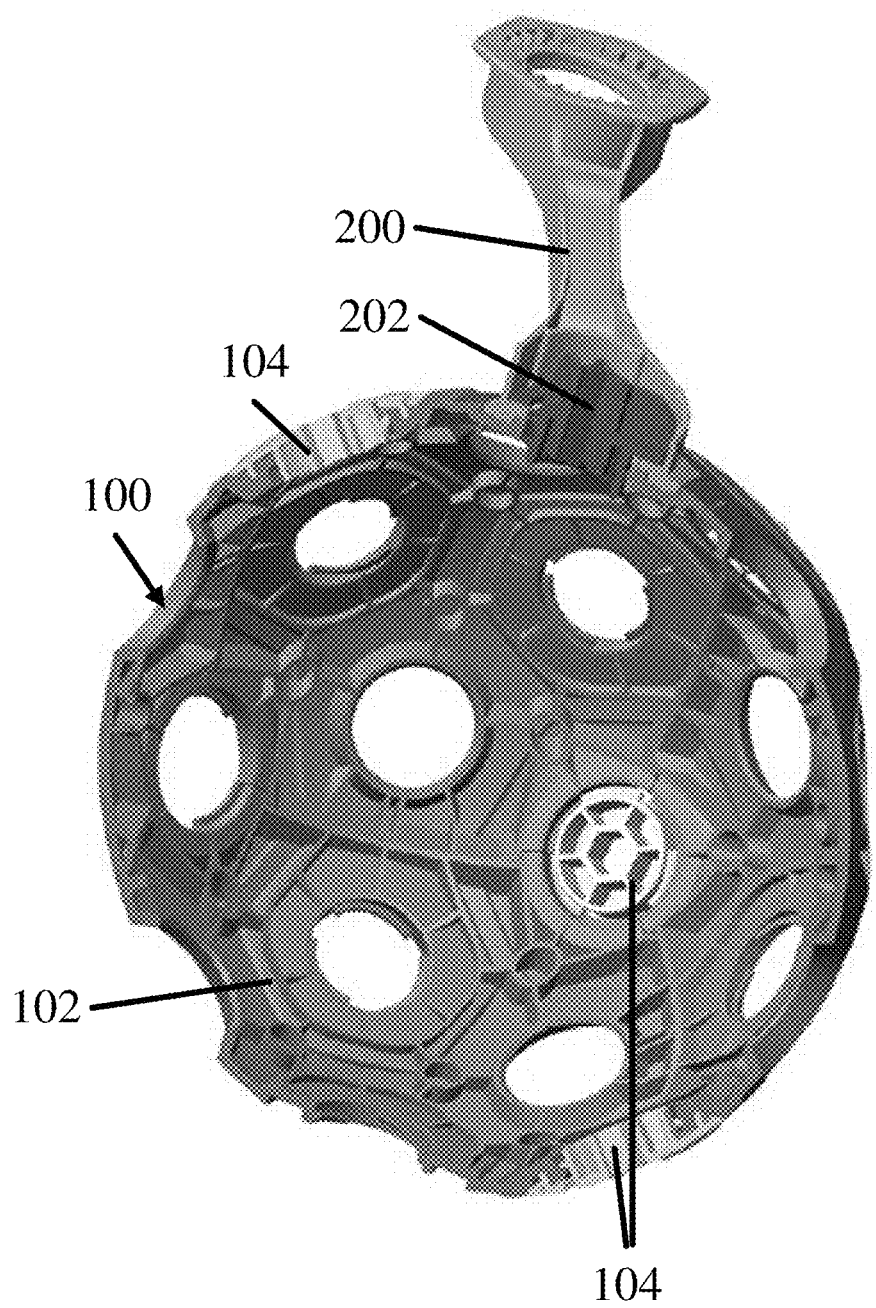
FIG. 9 is a cross-sectional view of FIG. 8.
Figure 10:
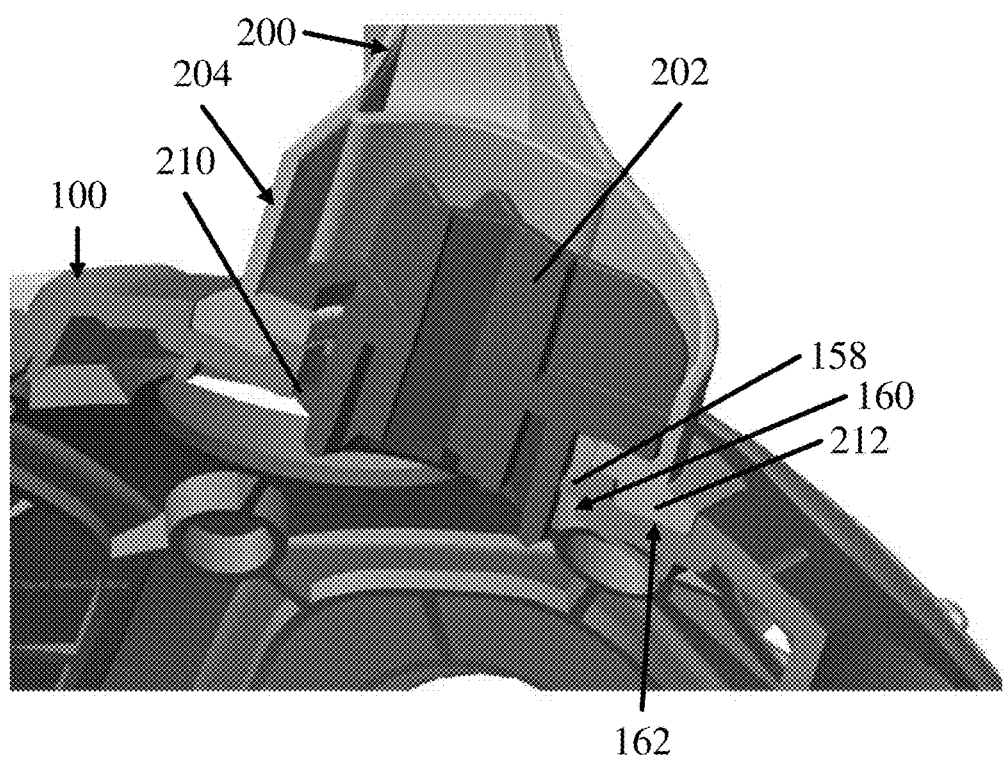
FIG. 10 is a detail view of FIG. 9.

As shown in the illustrated embodiment, the first and second end portions 204, 206 can optionally be coupled to the assembly with the coupler 202. For example as best shown in FIGS. 9-10, the coupler 202 can comprise external threads 210 configured to engage the internal threads 158 of the apertures 160 of the assembly 100 similar to the manner in which the attachment members 104 threadably engage the structural elements 102.

Referring to FIG. 8, in some embodiments, the first and second end portions 204, 206 of the connecting member 200 can be matably coupled to the assembly 100 such that relative rotational movement between the connecting member 200 and the assembly 100 is prevented. For example, the first and second end portions 204, 206 can comprise the non-circular (e.g., hexagonal) heads 212 configured to be disposed in corresponding non-circular (e.g., hexagonal) recesses 162 of the assembly 100. As such, edge surfaces of the non-circular recesses 162 can engage the non-circular heads 212 and prevent the connecting members 200 from rotating relative to the assembly 100, as best shown in FIG. 10.

Figure 11:
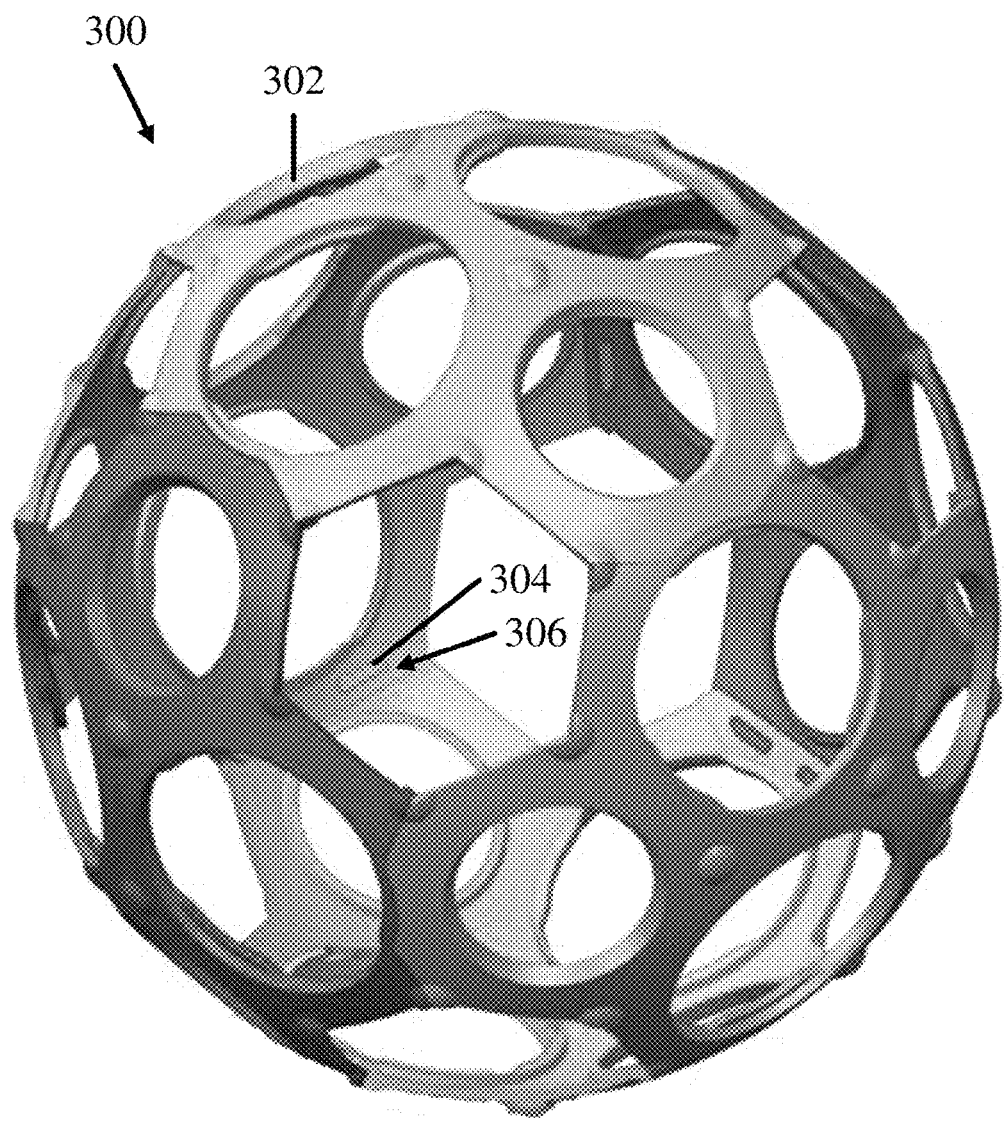
FIG. 11 shows another exemplary embodiment of a truncated icosahedron assembly.

FIG. 11 shows another exemplary embodiment of a truncated icosahedron assembly 300. The assembly 300 can comprise a plurality of structural elements 302 (e.g., six in the illustrated embodiment).

The structural elements can be coupled together in various ways. For example, in the illustrated embodiment, the structural elements 302 can comprise tabs 304 and openings 306 configured to receive the tabs 304 of an adjacent structural element 302.

Figure 12:
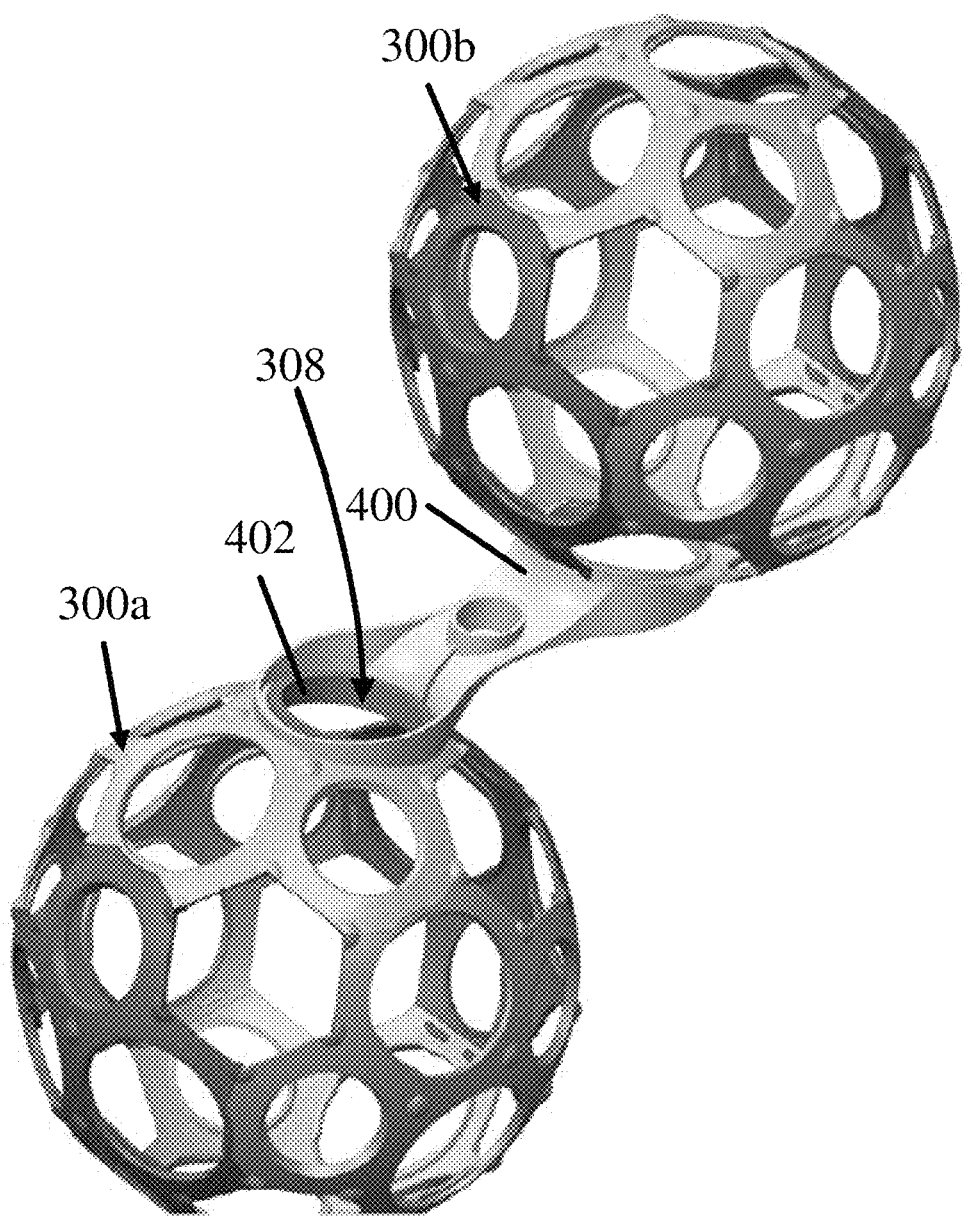
FIG. 12 shows other exemplary embodiments a connecting member and a coupler coupled to the truncated icosahedron assembly of FIG. 11.

FIG. 12 shows another exemplary embodiment of a connecting member 400 and an optional coupler 402. The connecting member 400 and the coupler 402 can, for example be used to couple a first assembly 300a to a second assembly 300b. The connecting member 400 and the coupler 402 can be configured to extend annularly around openings 308 of the assembly 300 without obstructing the openings 308.

Figure 13:
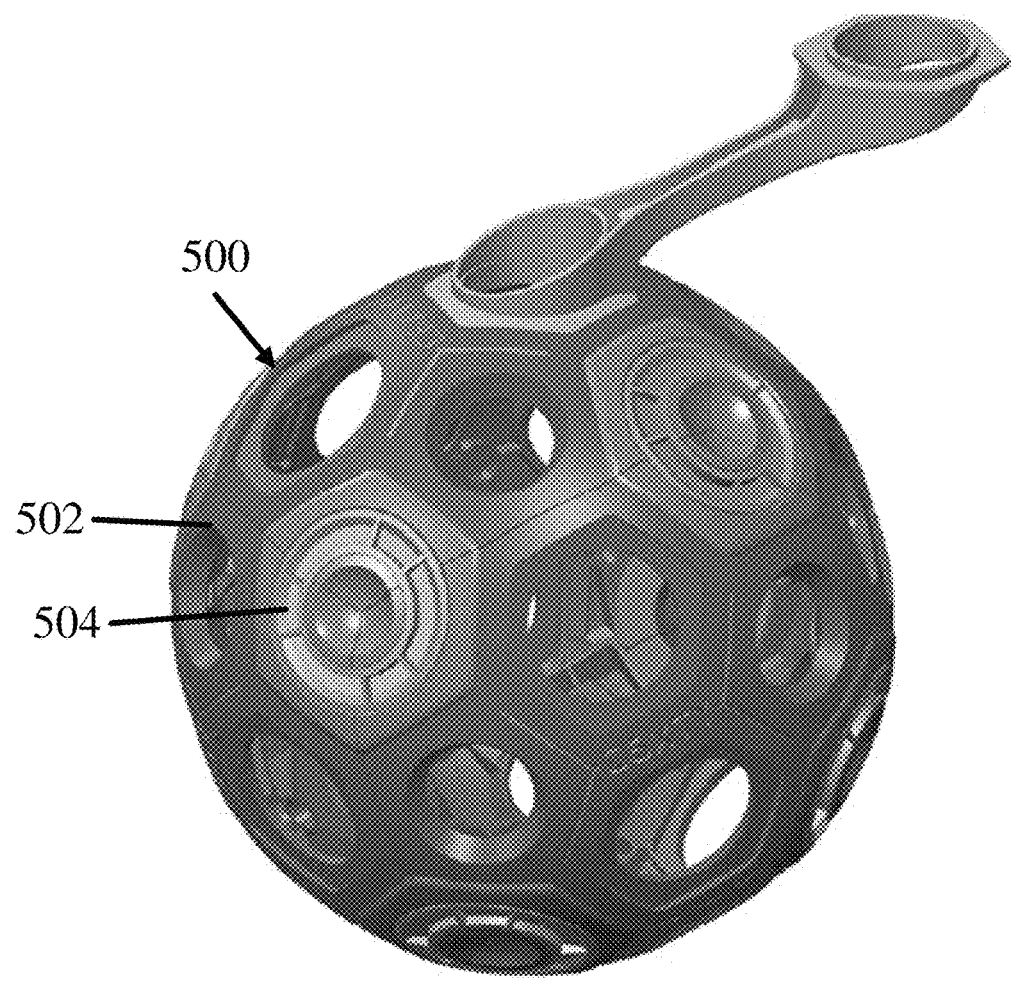
FIG. 13 shows another exemplary embodiment of a truncated icosahedron assembly.

FIG. 13 shows another exemplary embodiment of a truncated icosahedron assembly 500. The assembly 500 can comprise a plurality of structural elements 502 (e.g., six in the illustrated embodiment) and a plurality of attachment members 504 (e.g., eight in the illustrated embodiment). The structural elements 502 and the attachment members 504 of the assembly 500 can be configured similar to the structural elements 102 and the attachment members 104 of the assembly 100, respectively.

The attachment members 504 can, for example, be coupled to the structural elements via a snap-fit type connection.

A plurality of truncated icosahedron assemblies (e.g., the assemblies 100, 300, 500) can be coupled together in various structural arrangements. For example, the connecting members 200, 400 can be used to couple the assemblies together.

Figure 14:
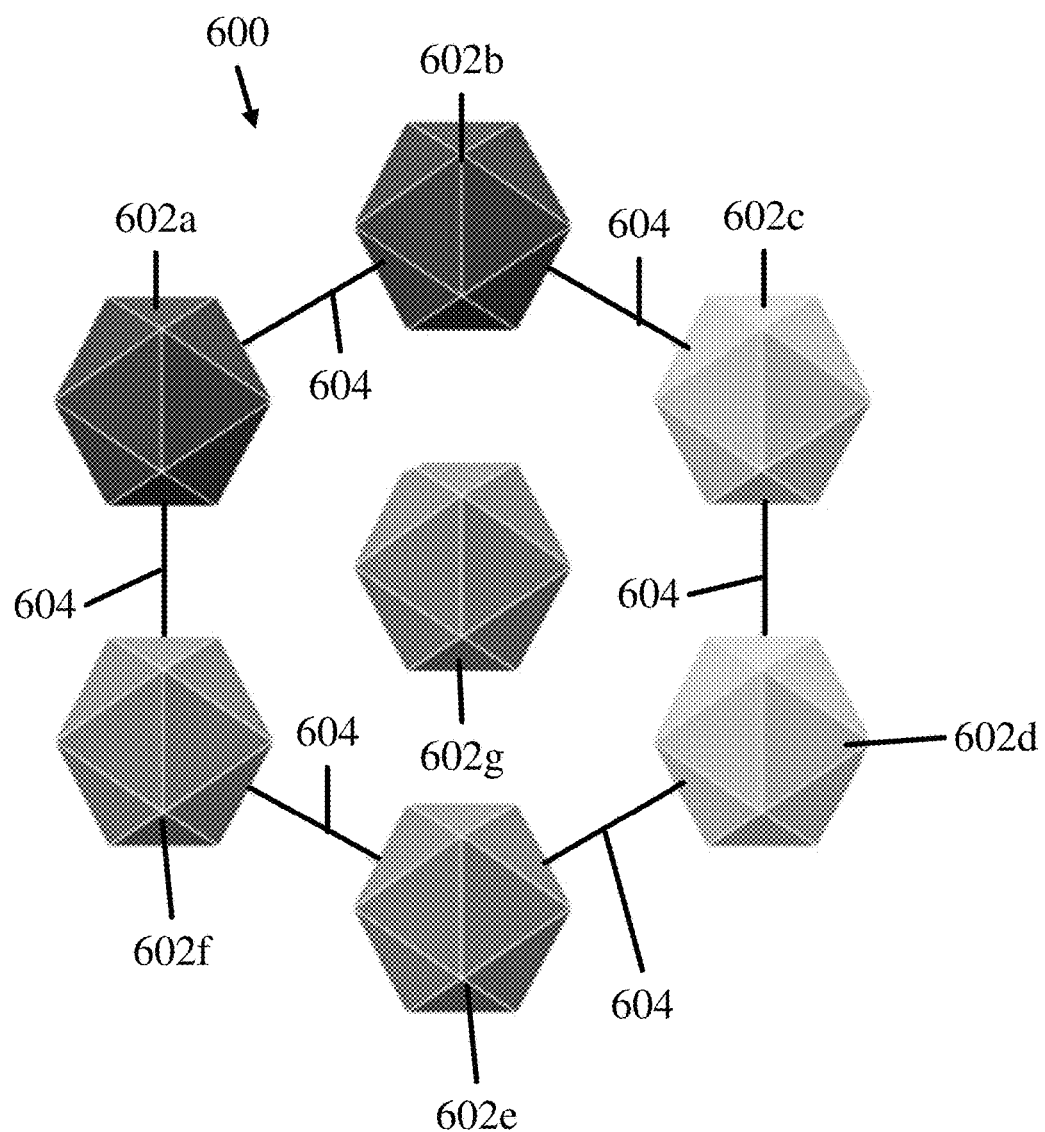
FIG. 14 shows an exemplary hexagonal structure comprising icosahedra assemblies and an icosahedron disposed in the center of the hexagonal structure.

FIG. 14 shows a hexagonal structure 600 comprising a plurality of icosahedra assemblies 602a-602f configured in a hexagonal configuration and an icosahedron assembly 602g in the center of the hexagonal configuration. The icosahedra assemblies 602a-602g (collectively referred to as "the assemblies 602" and generically as "an assembly 602") can be coupled together using connectors 604. It should be noted that although icosahedra assemblies are depicted in FIG. 14, truncated icosahedra assemblies can be used. It should also be noted that although the connectors 604 are shown schematically, the connectors can, in some embodiments, be configured similar to the connectors 200 and/or the connectors 400.

Figure 15:
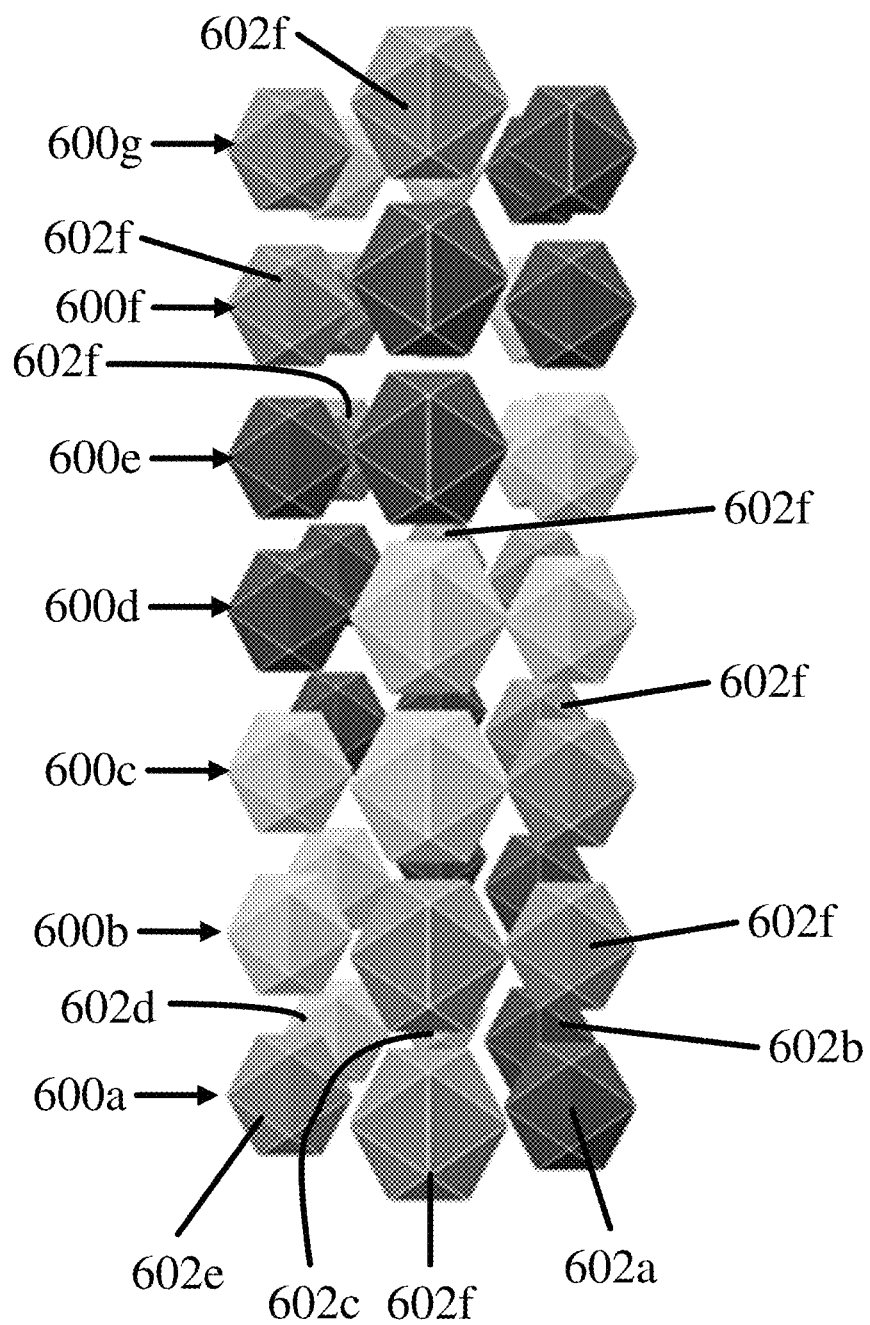
FIG. 15 shows a plurality of hexagonal structures assembled in a first configuration and forming a plurality of helices.
Figure 16:
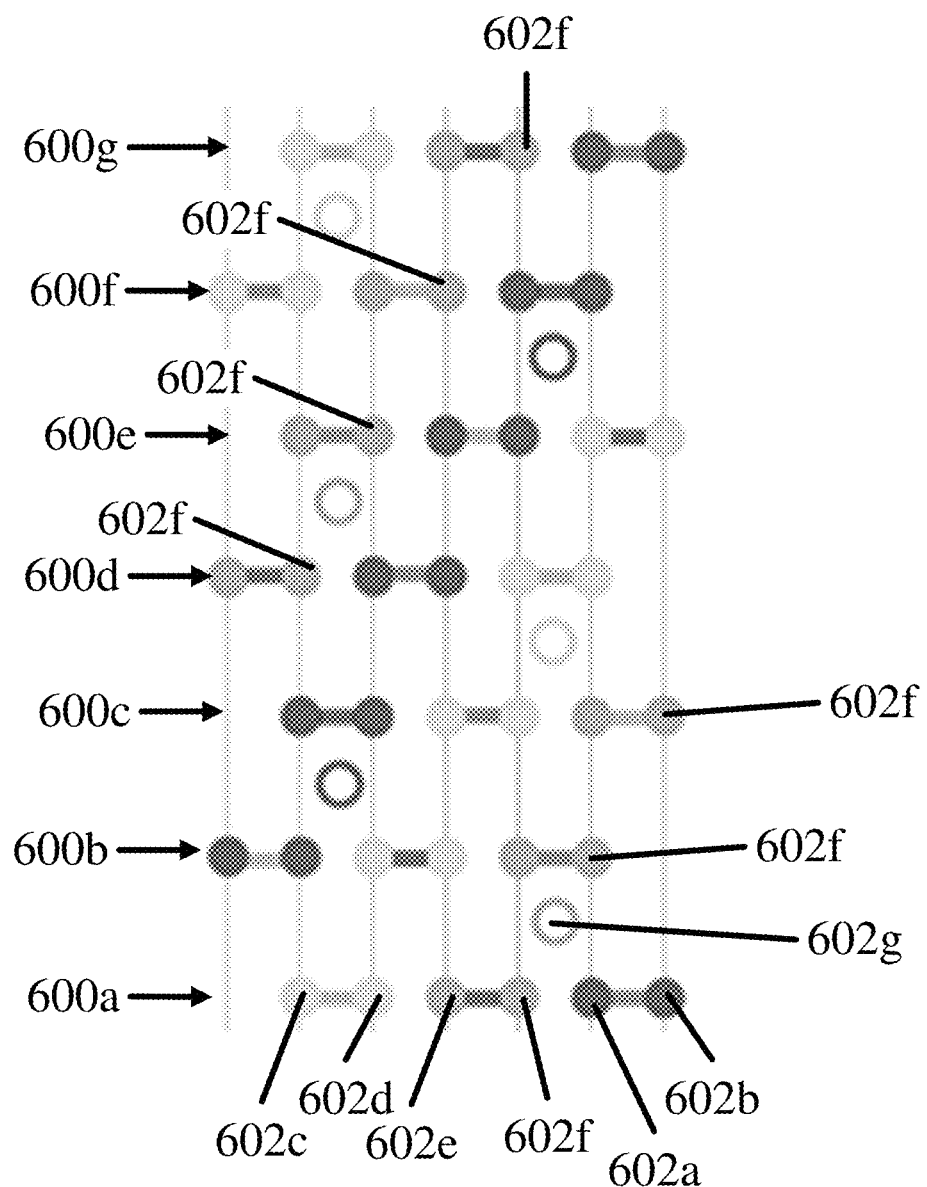
FIGS. 16-17 are schematic representations of the hexagonal structures and helices of FIG. 15.
Figure 17:
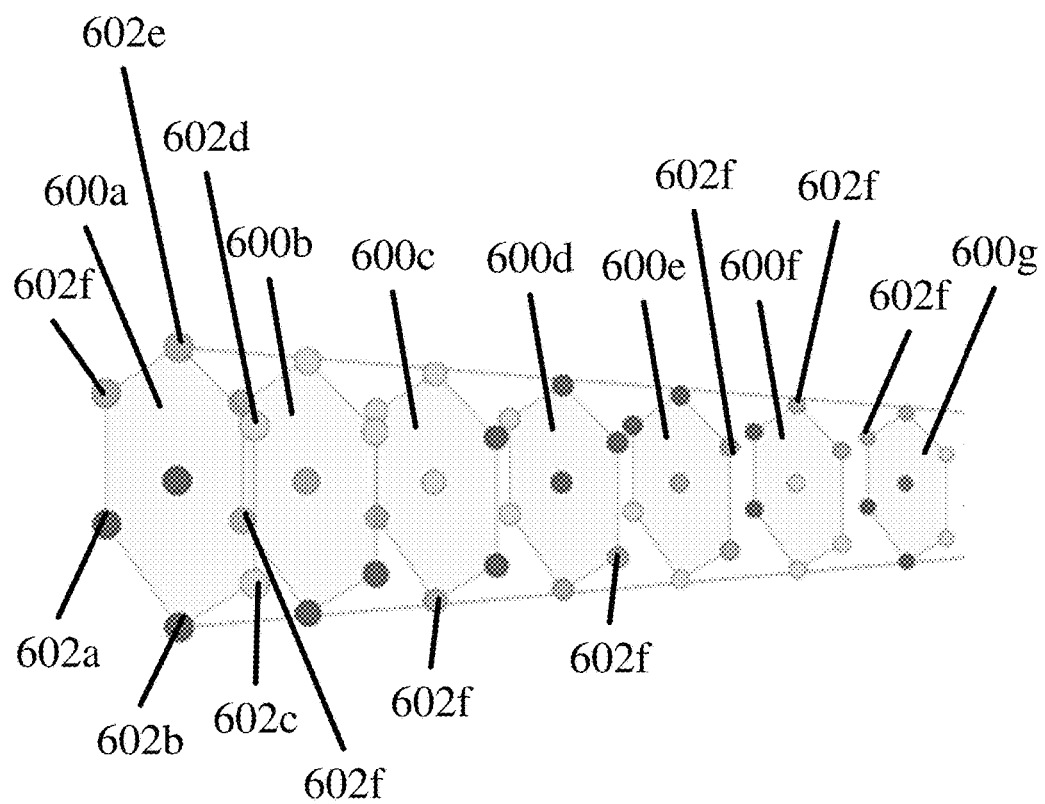

Referring now to FIGS. 15-17, a plurality of hexagonal structures 600a-600g can be assembled to form a plurality of helices or spirals. The helices can be formed by rotationally offsetting each hexagonal layer or row relative to an adjacent layer. For example, in certain embodiments, the each layer can be rotationally offset relative to an adjacent layer by about 60 degrees. In other words, each icosahedron is moved one rotational position at each layer. This can be observed in FIGS. 15-17 by tracking the icosahedron 602f from an initial rotational position at the first layer (e.g., the bottom layer as depicted in FIGS. 15-17), to sequential rotational positions at the second through sixth layers, and back to the initial rotational position at the seventh layer (e.g., the top layer as depicted in FIGS. 15-17).

Figure 18:
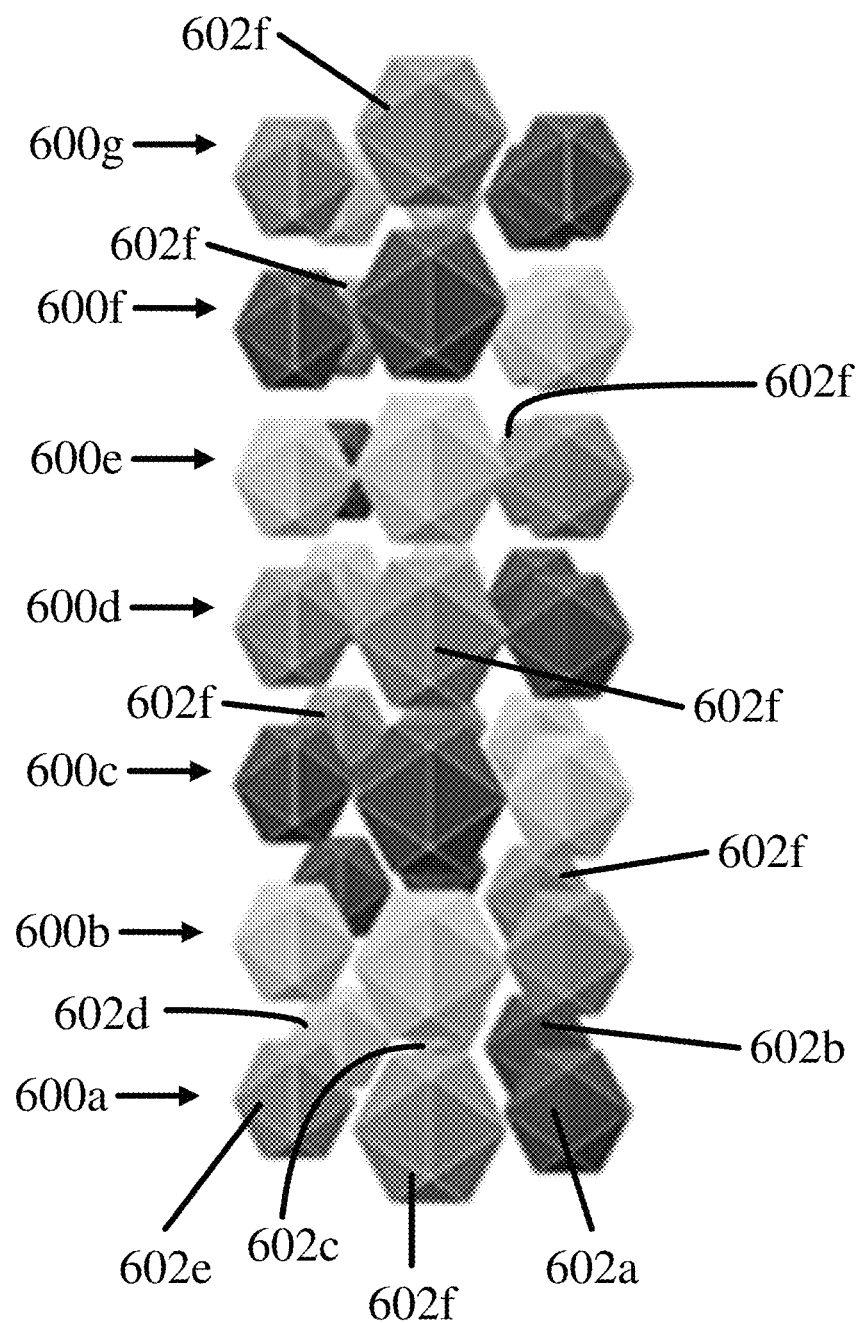
FIG. 18 shows a plurality of hexagonal structures assembled in a second configuration and forming a plurality of helices.

FIG. 18 depicts an alternative embodiment of the plurality of hexagonal structures 600a-600g in which each layer is rotationally offset relative to an adjacent layer by about 120 degrees. In other words, each icosahedron is moved two rotational positions at each layer. This can be observed in FIG. 18 by tracking the icosahedron 602f from an initial rotational position at the first layer, to sequential rotational positions at the second and third layers, and back to the initial rotational position at the fourth layer. In the embodiment shown in FIG. 18, the icosahedron 602f completes two revolutions from the first layer to the seventh layer.

Figure 19:
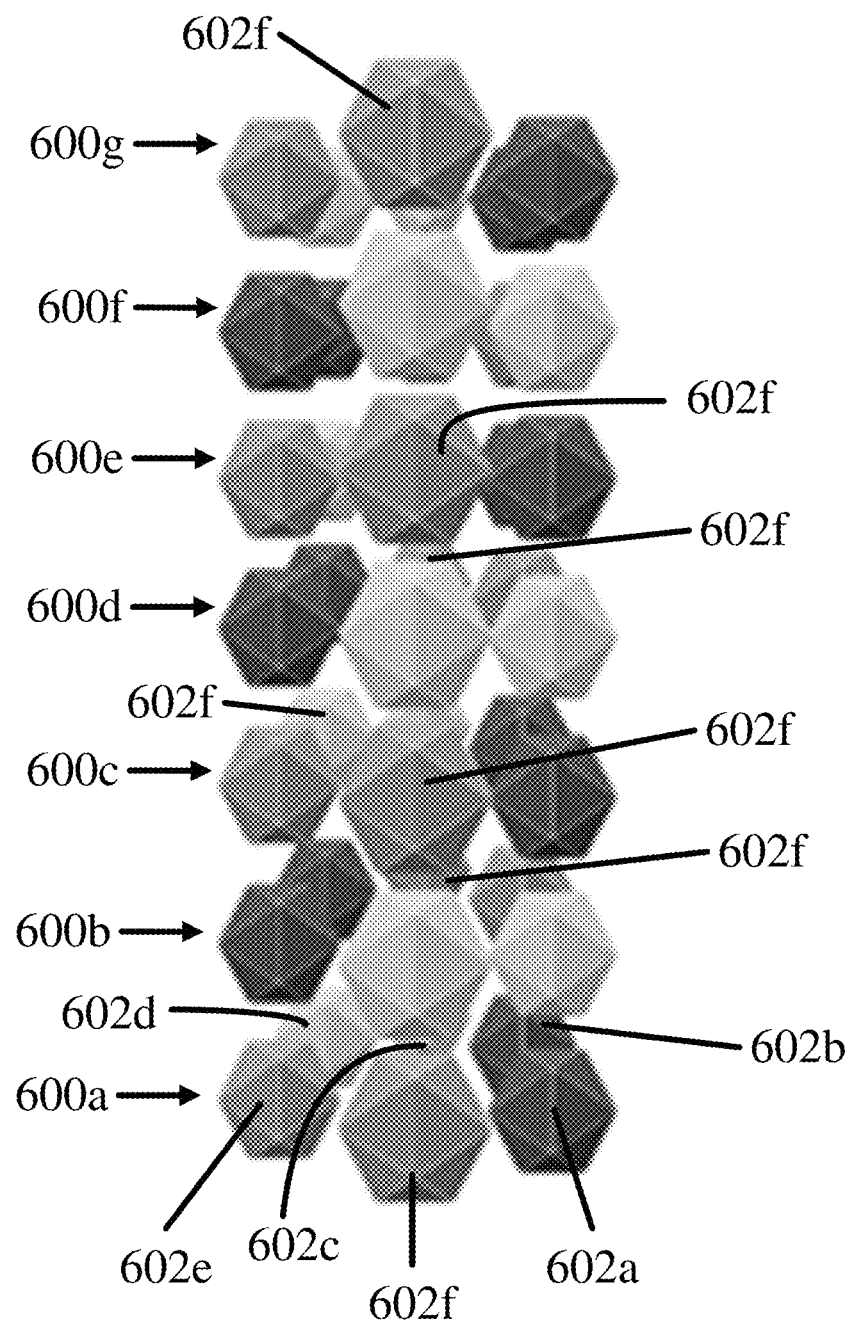
FIG. 19 shows a plurality of hexagonal structures assembled in a third configuration and forming a plurality of helices.

FIG. 19 depicts an alternative embodiment of the plurality of hexagonal structures 600a-600g in which each layer is rotationally offset relative to an adjacent layer by about 180 degrees. In other words, each icosahedron is moved three rotational positions at each layer. This can be observed in FIG. 19 by tracking the icosahedron 602f from an initial rotational position at the first layer, to an intermediate rotational position at the second layer, and back to the initial rotational position at the third layer. In the embodiment shown in FIG. 19, the icosahedron 602f completes three revolutions from the first layer to the seventh layer.

It should be noted that in some embodiments, the helices can include less or more than seven layers of icosahedra assemblies 602.

In some embodiments, the nucleus is fully constrained by three layers.

Figure 20:
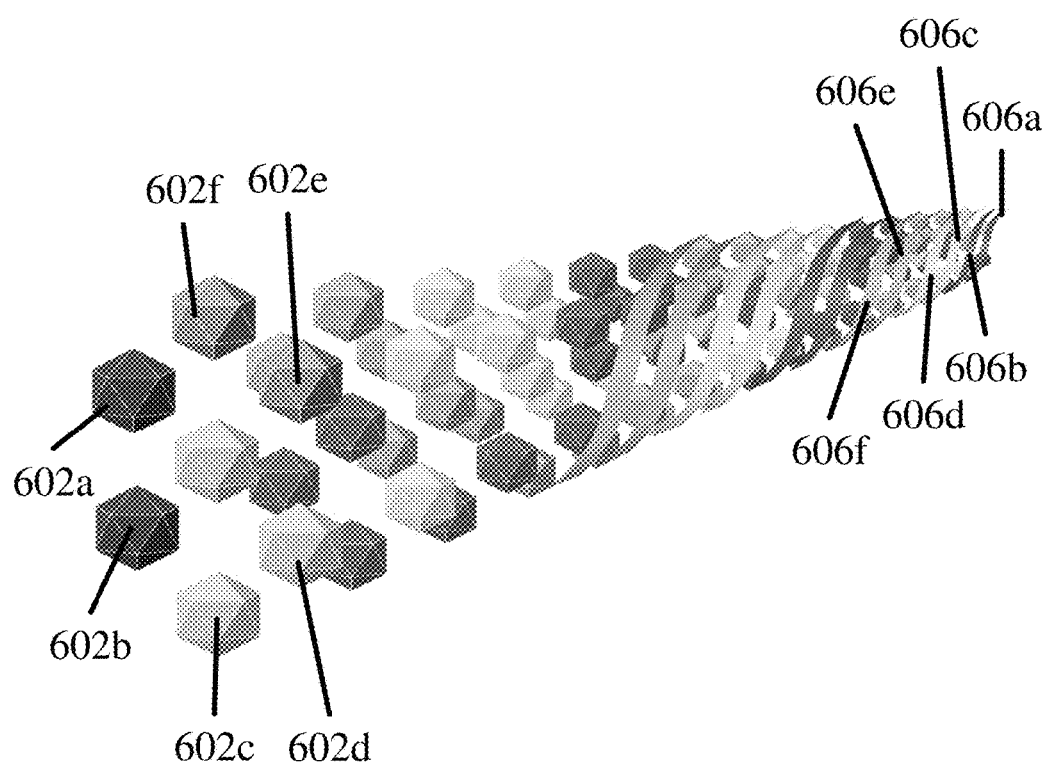
FIG. 20 shows a plurality of exemplary helical strands formed in-part by the icosahedra.
Figure 21:
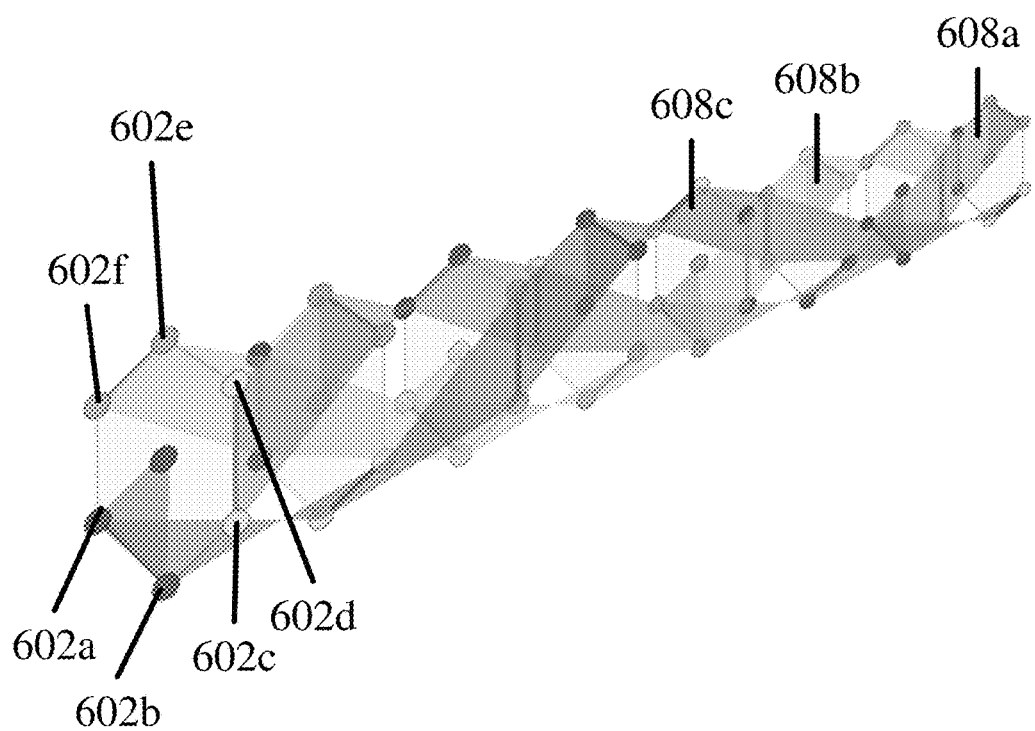
FIGS. 21-23 show a plurality of other exemplary helical strands formed in-part by the icosahedra.
Figure 22:
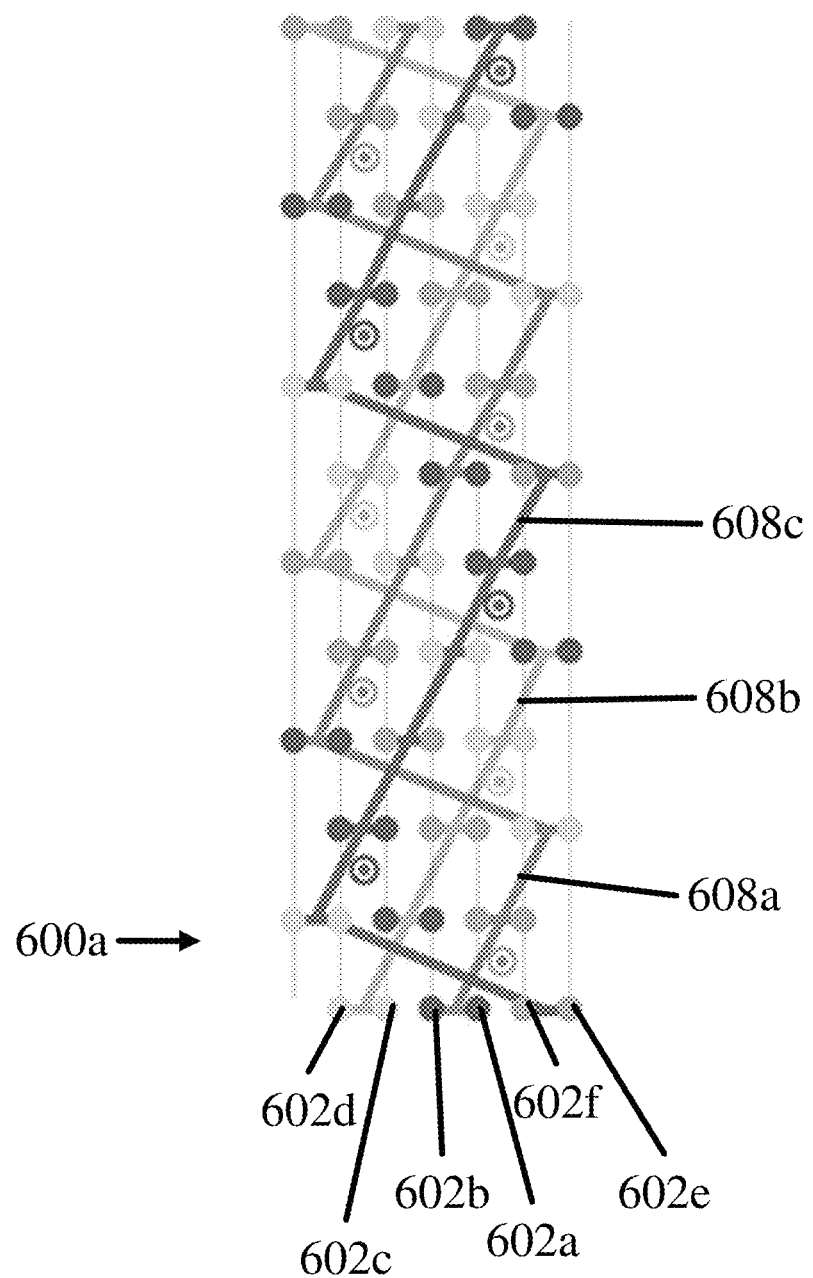
Figure 23:
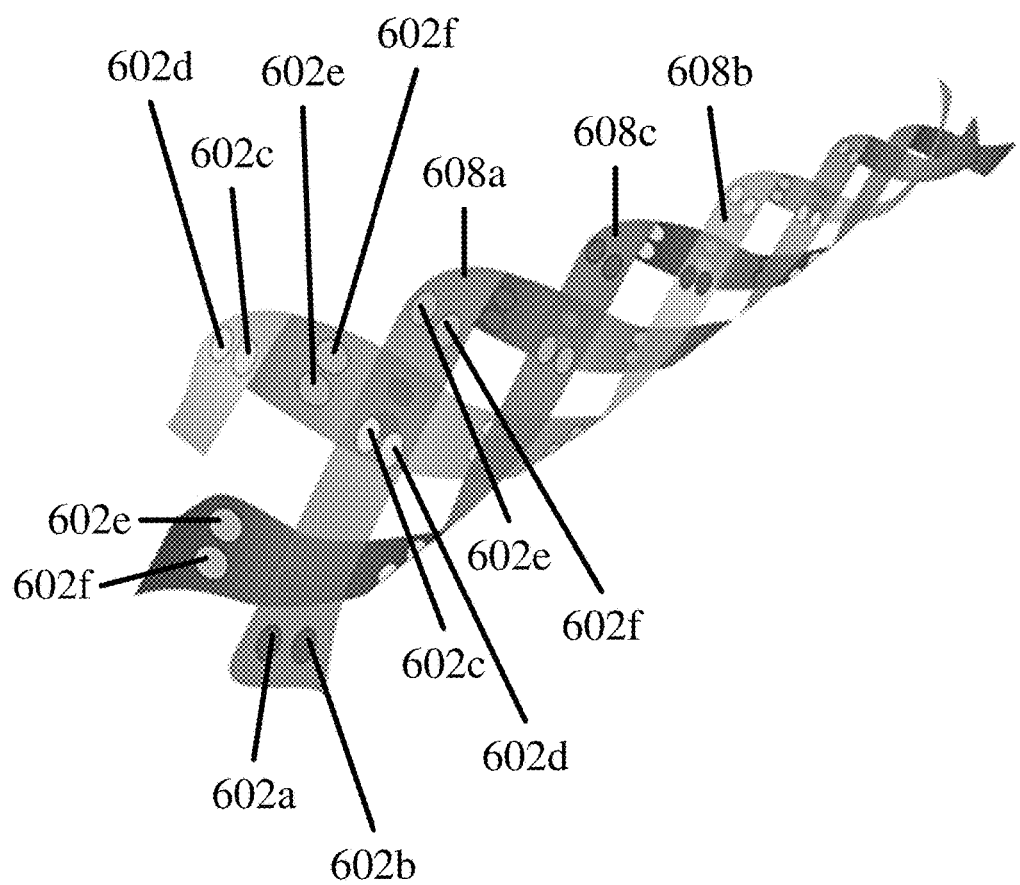

Referring to FIG. 20, in some embodiments, each icosahedron assembly 602 of the hexagonal structures 600 can be a point or location on a continuous strand or spiral comprising. For example, in the illustrated embodiment, there a six stands 606a-606f (i.e., two blue strands 606a-606b, two yellow strands 606c-606d, and two green strands 606e-606f), each following a respective icosahedron assembly 602a-602f at each layer. In other embodiments, as shown in FIGS. 21-23, there can be three strands 608a-608c, each following a respective pair of icosahedra assemblies 602 at each layer. In yet other embodiments, there can be two strands, each following a respective triplet of the icosahedra assemblies at each layer.

The structural elements, the attachment members, connecting members, and/or couplers can be formed from various materials including metals (e.g. steel, titanium,), polymers (e.g., ABS), ceramics (e.g., concrete), composites (e.g., carbon fiber and wood). In some embodiments, the structural elements, the attachment members, connecting members, and/or couplers can be formed from relatively flexible or squishy materials (e.g., rubber, foam, LDPE). In other embodiments, the structural elements, the attachment members, connecting members, and/or couplers can be formed from relatively rigid materials such as ABS, steel concrete, etc.

In certain embodiments, the structural elements can be made of materials that dissolve and/or accrete. For example, the structural elements can dissolve and/or accrete to form concrete.

In certain embodiments, the structural elements, the attachment members, connecting members, and/or couplers can be formed from the same material (e.g., ABS). In other embodiments, for example, a first component (e.g., the structural elements) can be formed from a first material (e.g., concrete), and a second component (e.g., the attachment members) can be formed from a second material (e.g., steel).

In some embodiments, for example, each of the structural elements of the assembly can be formed from the same material, e.g., ABS. In other embodiments, at least one of the structural elements 102 can be formed from a different material than at least one other structural element.

In some embodiments, for example, each of the attachment members of an assembly can be formed from the same material, e.g., ABS. In other embodiments, at least one of the attachment members can be formed from a different material than at least one other attachment members.

In some embodiments, radially inwardly facing surfaces (e.g., surface 154 of assembly 100 shown in FIG. 2) and/or radially outwardly facing surfaces (e.g., surface 156 or assembly 100 shown in FIG. 2) of the structural elements can comprise a coating and/or substance attached thereto. In some embodiments, the coating on the radially inwardly facing surfaces can be the same as the coating on the radially outwardly facing surfaces. In other embodiments, the coating on the radially inwardly facing surfaces can be different than the coating on the radially outwardly facing surfaces. For example, the radially outwardly facing surface can comprise a first coating and/or substance attached thereto that reacts slowly with an environment thereby protecting the contents within the assembly (e.g., a second coating and/or substance on the radially inwardly facing surface) for a desired time (e.g., until time to release and react the second coating and/or substance with the environment).

In yet other embodiments, the radially inwardly surfaces and/or the radially outwardly facing surfaces of each structural element can comprise the same coating and/or substance attached thereto the other structural elements. In other embodiments, the radially inwardly surfaces and/or the radially outwardly facing surfaces of each structural element can comprise a different coating and/or substance attached thereto than at least one other structural element.

In yet other embodiments, the radially inwardly surfaces and/or the radially outwardly facing surfaces can comprise one or more layers of coating and/or substances applied thereto.

In certain embodiments, the coating and/or substances can, for example, be a pharmaceutical (e.g., drug). In particular embodiments, the assembly can be configured to exclude toxins.

In some embodiments, the hexagonal portions and the pentagonal portions of the assembly can be comprise curved edges and/or rounded vertices. In some embodiments, the structural elements can be coupled together in a flat or sheet-like configuration and then formed into a truncated icosahedral or spherical truncated icosahedral configuration. In some embodiments, the structural elements can be formed in a flat configuration. In other embodiments, the structural elements can comprise a radius such that the assembly approximates a sphere.

In some embodiments, the hexagonal portions and the pentagonal portions can be solid or at least substantially solid. In other embodiments, the hexagonal portions and the pentagonal portions can comprise struts coupled together in a lattice type structure.

The vertices of the assembly can be coded in a unique number system such that each vertices is a unique location when assembled. The unique locations can be used to store binary information in the form of a small electrical charge at the location.

This disclosed technology can be applied to various applications. For example, the described assemblies can be used for framing for houses, from creating materials that flow into crevices and mold and assemble into yet stronger structural materials by applying, light heat or magnetism to structural elements formed from growth media and grow together and intertwine with one another to form skin, walls, and/or structures.

The configuration of the structural elements can, for example, allow the structural elements to nest into one another. This compactness can, for example, greatly reduce the volume of the assemblies for storage and/or transportation. A great variety of shapes and sizes can be packaged to take advantage of modern distribution systems.

In certain embodiments, unassembled structural elements can be flushed into a nanotube and then allowed to chemically assemble into assemblies inside the nanotube to add lateral strength to a nanotube wall. This can, for example, improve efficiency compared to pre-assembling the structural elements and inserting them into the nanotubes.

In one particular embodiment, the structural elements can be magnetically guided to the desired location in a body or structure and then they can be assembled into stiff load bearing structures.

The features described herein with regard to any example can be combined with other features described in any one or more of the other examples. For example, components, materials and/or properties of the assembly 100 can be combined with the components, materials, and/or properties of the assembly 300.

In view of the many possible embodiments to which the principles of the disclosure may be applied, it should be recognized that the illustrated embodiments are only preferred examples and should not be taken as limiting the scope of the claims. Rather, the scope of the claimed subject matter is defined by the following claims and their equivalents.

The invention claimed is:

1. An assembly, comprising:
   a plurality of structural elements, wherein each structural element includes first and second hexagonal portions and first and second pentagonal portions,
   wherein the first and second hexagonal portions of each structural element are coupled together at a first edge of the first hexagonal portion and a second edge of the second hexagonal portion,
   wherein the first and second pentagonal portions of each structural element are spaced relative to each other by the first and second hexagonal portions,
   wherein the first pentagonal portion of each structural element is coupled to the first and second hexagonal portions adjacent the first edge of the first hexagonal portion and the second edge of the second hexagonal portion,
   wherein the second pentagonal portion of each structural element is coupled to the first and second hexagonal portions adjacent the first edge of the first hexagonal portion and the second edge of the second hexagonal portion,
   wherein the structural elements are configured such that the structural elements can be coupled together in a truncated icosahedral configuration, and
   wherein the structural elements comprise inside surfaces and outside surfaces, wherein at least one of the outside surfaces comprises a first coating, wherein at least one of the inside surfaces comprises a second coating, and wherein the at least one first coating is configured to react with a substance more slowly than the at least one second coating reacts with the substance.

2. The assembly of claim 1, wherein the plurality of structural elements comprises six structural elements.

3. The assembly of claim 1, wherein each of the structural elements is rotated 90 degrees relative to an adjacent structural element.

4. The assembly of claim 1, wherein the structural elements comprise curved surfaces such that the structural elements form a sphere when the structural elements are coupled together.

5. The assembly of claim 1, wherein the structural elements are coupled together magnetically.

6. The assembly of claim 1, wherein the structural elements are flexible.

7. The assembly of claim 1, wherein the structural elements are rigid.

8. The assembly of claim 1, wherein one of the structural elements is formed from a different material than another structural element.

9. The assembly of claim 1, wherein the structural elements are coupled together by attachment members.

10. The assembly of claim 9, wherein the attachment members engage the structural elements in a snap-fit connection.

11. The assembly of claim 1, wherein the structural elements comprise mating features configured to interlock the structural elements relative to adjacent structural elements.

12. The assembly of claim 11, wherein the assembly is one of a plurality of assemblies that are coupled together with connecting members to form a hexagonal layer.

13. The assembly of claim 12, wherein the hexagonal layer is one of a plurality of hexagonal layers that are stacked and coupled together.

14. The assembly of claim 13, wherein each of the hexagonal layers is rotationally offset relative to an adjacent layer so as to form one or more helices.

15. The assembly of claim 14, wherein each of the hexagonal layers is rotationally offset relative to an adjacent layer by about 60-180 degrees.

16. An assembly, comprising:
a plurality of structural elements, wherein each structural element includes first and second hexagonal portions and first and second pentagonal portions,
wherein the first and second hexagonal portions of each structural element are coupled together at a first edge of the first hexagonal portion and a second edge of the second hexagonal portion,
wherein the first and second pentagonal portions of each structural element are spaced relative to each other by the first and second hexagonal portions,
wherein the first pentagonal portion of each structural element is coupled to the first and second hexagonal portions adjacent the first edge of the first hexagonal portion and the second edge of the second hexagonal portion,
wherein the second pentagonal portion of each structural element is coupled to the first and second hexagonal portions adjacent the first edge of the first hexagonal portion and the second edge of the second hexagonal portion,
wherein the structural elements are configured such that the structural elements can be coupled together in a truncated icosahedral configuration,
wherein the structural elements comprise mating features configured to interlock the structural elements relative to adjacent structural elements,
wherein the assembly is one of a plurality of assemblies that are coupled together with connecting members to form a hexagonal layer,
wherein the hexagonal layer is one of a plurality of hexagonal layers that are stacked and coupled together,
wherein each of the hexagonal layers is rotationally offset relative to an adjacent layer so as to form one or more helices, and
wherein each of the hexagonal layers is rotationally offset relative to an adjacent layer by about 60-180 degrees.

17. The assembly of claim 16, wherein each assembly of the plurality of assemblies comprises six structural elements including first and second hexagonal portions and first and second pentagonal portions.

18. The assembly of claim 16, wherein the structural elements comprise curved surfaces such that each assembly forms a sphere when the structural elements of the assembly are coupled together.

19. The assembly of claim 16, wherein the structural elements of each assembly are coupled together magnetically.

20. The assembly of claim 16, wherein a first structural element of a first assembly is formed from a different material than a second structural element of the first assembly.

* * * * *